(12) United States Patent
Naiknaware et al.

(10) Patent No.: US 8,796,884 B2
(45) Date of Patent: Aug. 5, 2014

(54) ENERGY CONVERSION SYSTEMS WITH POWER CONTROL

(75) Inventors: Ravindranath Naiknaware, Portland, OR (US); Vincenzo DiTommaso, Beaverton, OR (US); Triet Tu Le, Tualatin, OR (US); Robert D. Batten, Tualatin, OR (US); Terri Shreeve Fiez, Corvallis, OR (US)

(73) Assignee: SolarBridge Technologies, Inc., Austin, TX (US)

( * ) Notice: Subject to any disclaimer, the term of this patent is extended or adjusted under 35 U.S.C. 154(b) by 1427 days.

(21) Appl. No.: 12/368,990

(22) Filed: Feb. 10, 2009

(65) Prior Publication Data

US 2010/0157638 A1    Jun. 24, 2010

Related U.S. Application Data

(63) Continuation-in-part of application No. 12/340,715, filed on Dec. 20, 2008.

(60) Provisional application No. 61/149,305, filed on Feb. 2, 2009.

(51) Int. Cl.
*H02M 7/537*    (2006.01)
(52) U.S. Cl.
USPC .......................................... 307/102; 307/151
(58) Field of Classification Search
USPC ................................................ 307/102, 151
See application file for complete search history.

(56) References Cited

U.S. PATENT DOCUMENTS

| 4,217,633 | A | 8/1980 | Evans, Jr. |
| 4,404,472 | A | 9/1983 | Steigerwald |
| 5,274,274 | A | 12/1993 | Leman et al. |
| 5,604,430 | A | 2/1997 | Decker et al. |
| 5,623,398 | A | 4/1997 | Beach et al. |
| 5,691,627 | A | 11/1997 | Shum |
| 5,801,519 | A | 9/1998 | Midya et al. |
| 5,870,266 | A | 2/1999 | Fogg |
| 5,914,542 | A | 6/1999 | Weimer et al. |
| 6,075,716 | A | 6/2000 | He et al. |

(Continued)

FOREIGN PATENT DOCUMENTS

WO    WO 20071080429    7/2007

OTHER PUBLICATIONS

International Search Report and Written Opinion dated Aug. 3, 2010, from PCT Application No. PCT/US2009/068871, filed Dec. 18, 2009, 9 pages.

(Continued)

*Primary Examiner* — Fritz M Fleming
(74) *Attorney, Agent, or Firm* — Barnes & Thornburg LLP

(57) ABSTRACT

In one embodiment, a power conversion system includes a controller to provide power control to a converter, and a distortion mitigation circuit. In another embodiment, a system includes a converter to transfer power between a power source and a load having fluctuating power demand, and a controller to provide power control, where the controller may selectively disable the power control. In another embodiment, a power conversion system includes a controller to generate a drive signal to provide power control to a power path in response to a sense signal from the power path, where the sense signal is taken from other than the input of the power path, or the drive signal is applied to the power path at other than a first power stage.

19 Claims, 22 Drawing Sheets

(56) References Cited

U.S. PATENT DOCUMENTS

| | | |
|---|---|---|
| 6,111,767 A | 8/2000 | Handleman |
| 6,259,017 B1 | 7/2001 | Takehara et al. |
| 6,262,558 B1 | 7/2001 | Weinberg |
| 6,339,538 B1 | 1/2002 | Handleman |
| 6,611,441 B2 | 8/2003 | Kurokami et al. |
| 6,614,133 B2 | 9/2003 | Belson et al. |
| 6,690,590 B2 | 2/2004 | Stamenic et al. |
| 6,849,842 B2 | 2/2005 | Little |
| 7,031,176 B2 | 4/2006 | Kotsopoulos et al. |
| 7,091,752 B2 | 8/2006 | Balakrishnan |
| 7,158,389 B2 | 1/2007 | Yasumura |
| 7,221,011 B2 | 5/2007 | Banerjee et al. |
| 7,319,313 B2 | 1/2008 | Dickerson et al. |
| 7,335,944 B2 | 2/2008 | Banerjee et al. |
| 7,372,709 B2 | 5/2008 | Mazumder et al. |
| 7,382,112 B2 | 6/2008 | Krein |
| 7,391,088 B2 | 6/2008 | Balakrishnan |
| 7,435,897 B2 | 10/2008 | Russell |
| 2003/0036806 A1 | 2/2003 | Schienbein et al. |
| 2003/0198063 A1 | 10/2003 | Smyth |
| 2004/0223310 A1 | 11/2004 | Toyomura |
| 2005/0110454 A1 | 5/2005 | Tsai et al. |
| 2005/0275386 A1 | 12/2005 | Jepsen et al. |
| 2006/0062034 A1* | 3/2006 | Mazumder et al. ............ 363/131 |
| 2006/0154065 A1 | 7/2006 | Bloch |
| 2006/0250115 A1* | 11/2006 | Johnson .......................... 322/58 |
| 2007/0133241 A1 | 6/2007 | Mumtaz et al. |
| 2007/0159866 A1 | 7/2007 | Siri |
| 2007/0221267 A1 | 9/2007 | Fornage |
| 2007/0236187 A1 | 10/2007 | Wai et al. |
| 2008/0055952 A1 | 3/2008 | Chisenga et al. |
| 2008/0136367 A1 | 6/2008 | Adest et al. |
| 2008/0143188 A1 | 6/2008 | Adest et al. |
| 2008/0144294 A1 | 6/2008 | Adest et al. |
| 2008/0147335 A1 | 6/2008 | Adest et al. |
| 2008/0150366 A1 | 6/2008 | Adest et al. |
| 2008/0164766 A1 | 7/2008 | Adest et al. |
| 2008/0266922 A1 | 10/2008 | Mumtaz et al. |

OTHER PUBLICATIONS

C. Rodriguez and G. Amaratunga, "Dynamic stability of grid-connected photovoltaic systems," in Proc. IEEE Power Eng. Soc. Gen. Meeting, Jun. 2004, pp. 2194-2200.

Enslin, J.H.R., "Integrated Photovoltaic Maximum Power Point Tracking Converter", Dec. 1997, pp. 769-773, vol. 44 Issue 6, IEEE Transactions on Industrial Electronics.

Walker, G.R., "Cascaded DC-DC Converter Connection of Photovoltaic Modules", Jul. 2004, p. 1130-1139, vol. 19 Issue 4, IEEE Transactions on Power Electronics.

Brekken, T., "Utility-Connected Power Converter for Maximizing Power Transfer from a Photovoltaic Source While Drawing Ripple-Free Current", Power Electronics Specialists Conference, 2002, IEEE 33rd Annual, p. 1518-1522, vol. 3, IEEE.

Ahmed, N.A., "Time-Sharing Sinewave Absolute Value Tracking Boost Chopper Controlled One Stage Power Conditioner with Non Electrolytic Capacitor DC Filter Link", International Conference on Power Electronics and Drives Systems (PEDS), 2005, p. 185-191, vol. 1, IEEE PEDS.

Choi, J.W., "Resonant Link Bidirectional Power Converter Without Electrolytic Capacitor", 1993, 24th Annual IEEE Power Electronics Specialists Conference, 1993, PESC '93 Record, p. 293-299, IEEE.

De Oliveira Filho, M.E., "A Control Method for Voltage Source Inverter Without DC Link Capacitor", Jun. 2008, IEEE Power Electronics Specialists Conference, 2008. PESC 2008, p. 4432-4437, IEEE.

Sarén, H. "Verification of Frequency Converter with Small DC-Link Capacitor", 2005 European Conference on Power Electronics and Applications, p. 1-10.

Hirao, T., "A Modified Modulation Control of a Single-Phase Inverter with Enhanced Power Decoupling for a Photovoltaic AC Module", 2005 European Conference on Power Electronics and Applications, p. 1-10.

Khajehoddin, S.A., "A Robust Power Decoupler and Maximum Power Point Tracker Topology for a Grid-Connected Photovoltaic System", Jun. 2008, Power Electronics Specialists Conference (PESC 2008), p. 66-69, IEEE.

Rodriguez, C., "Energy Control for Long Lifetime Photovoltaic AC Module Inverter", Jun. 2006, 37th IEEE Power Electronics Specialists Conference, 2006 (PESC '06), p. 1-6, IEEE.

Rodriguez, C., "Long-Lifetime Power Inverter for Photovoltaic AC Modules", Jul. 2008, IEEE Transactions on Industrial Electronics, p. 2593-2601, vol. 55, Issue 7, IEEE.

Shinjo, F., "A Single-Phase Grid-Connected Inverter with a Power Decoupling Function", Power Electronics Specialists Conference, 2007. (PESC 2007) IEEE, p. 1245-1249, IEEE.

Shimizu, T., "A Flyback-type Single Phase Utility Interactive Inverter with Low-frequency Ripple Current Reduction on the DC Input for an AC Photovoltaic Module System", 2002, pp. 1483-1488, IEEE.

Li, Q., "Recent Development in the Topologies for Photovoltaic Module Integrated Converters", Jun. 2006, Power Electronics Specialists Conference, 2006 (PESC '06) 37th IEEE, pp. 1-8, IEEE.

Li, Q., "A Review of the Single Phase Photovoltaic Module Integrated Converter Topologies With Three Different DC Link Configurations", May 2008, IEEE Transactions on Power Electronics, pp. 1320-1333, vol. 23, No. 3, IEEE.

Kjaer, S.B., "A Review of Single-Phase Grid-Connected Inverters for Photovoltaic Modules", Oct. 2005, IEEE Transactions on Industry Applications, pp. 1292-2005, vol. 41, No. 5, IEEE.

Wills, "The AC Photovoltaic Module", May 1996, 25th PVSC, pp. 1231-1234, IEEE.

Amaratunga, Gehan, "Grid Connected Solar Power in Cities", Oct. 16, 2007, Power Point presentation, pp. 1-27, University of Cambridge.

U.S. Appl. No. 12/340,715, filed Dec. 20, 2008, not yet published.

U.S. Appl. No. 12/368,987, filed Feb. 10, 2009, not yet published.

International Search Report dated Feb. 12, 2009, from related PCT application No. PCT/US2008/87882, filed Dec. 21, 2008.

Written Opinion of the International Searching Authority from International Search Report dated Feb. 12, 2009, from related PCT application No. PCT/US2008/87882, filed Dec. 21, 2008.

International Preliminary Report on Patentability dated Jun. 22, 2010 for PCT application No. PCT/US2008/087882 filed Dec. 21, 2008.

* cited by examiner

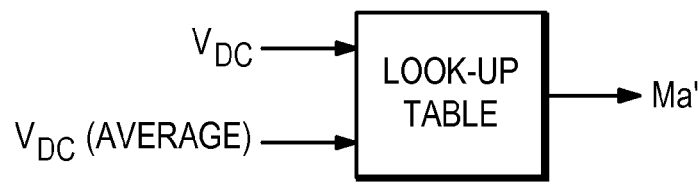
FIG.26
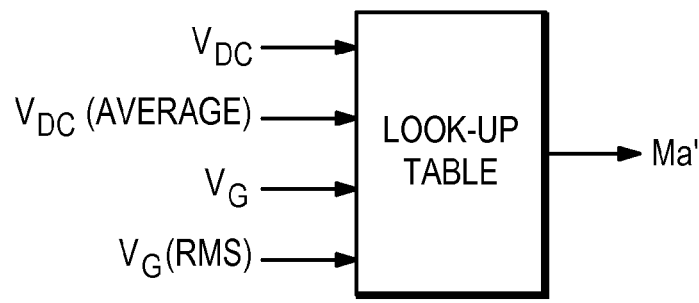
FIG.27
FIG.28
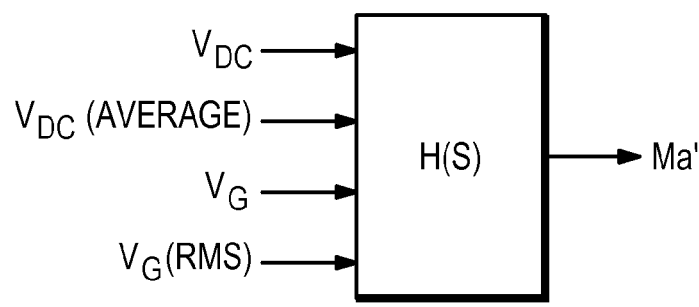
FIG.29

ENERGY CONVERSION SYSTEMS WITH POWER CONTROL

CROSS-REFERENCE TO RELATED APPLICATIONS

This application is a continuation-in-part of U.S. patent application Ser. No. 12/340,715 filed Dec. 20, 2008, which is incorporated by reference. This application claims priority from U.S. Provisional Patent application Ser. No. 61/149,305 filed Feb. 2, 2009, which is incorporated by reference.

BACKGROUND

Power converters are used to convert electric power from one form to another, for example, to convert direct current (DC) power to alternating current (AC) power. One important application for power converters is in transferring power from energy sources such as solar panels, batteries, fuel cells, etc., to electric power distribution systems such as local and regional power grids. Most power grids operate on AC current at a line (or mains) frequency of 50 or 60 cycles per second (Hertz or Hz). Power in an AC grid flows in a pulsating manner with power peaks occurring at twice the line frequency, i.e., 100 Hz or 120 Hz. In contrast, many energy sources supply DC power in a steady manner. Therefore, a power conversion system for transferring power from a DC source to an AC grid typically includes some form of energy storage to balance the steady input power with the pulsating output power.

This can be better understood with reference to FIG. 1 which illustrates the mismatch between a DC power source and a 60 Hz AC load. The maximum amount of power available from the DC source is shown as a constant value. In contrast, the amount of power that must be transferred to the AC load fluctuates from zero to a maximum value and back down to minimum once every 8.33 milliseconds (ms). During time T1, the power available from the DC source exceeds the instantaneous power required by the AC load. During time T2, however, the maximum power available from the DC source is less than that required by the load. Therefore, to effectively transfer power from the source to the load, the power conversion system must store the excess energy from the power source during time T1 (shown as the shaded area S), and discharge the stored energy to the load during time T2 (shown as the shaded area D).

Energy storage devices for power converters tend to be expensive, bulky, unreliable, and inefficient. These factors have been barriers to large-scale adoption of alternative energy sources such as solar and fuel cells which generate electricity in the form of DC power. They have also been barriers to large scale adoption of back-up power systems for computers, residences, schools, businesses, etc.

The cost and reliability factors have been especially critical for solar energy systems. Solar panel makers have improved the reliability of their products to the point that 20-year warranties are common. Manufacturers of power converters, however, have not reached a point where they can offer warranties that are comparable to those for solar panels.

BRIEF DESCRIPTION OF THE DRAWINGS

FIGS. 26-29 illustrate embodiments of predistortion elements according to some of the inventive principles of this patent disclosure.

DETAILED DESCRIPTION

Figure 1:
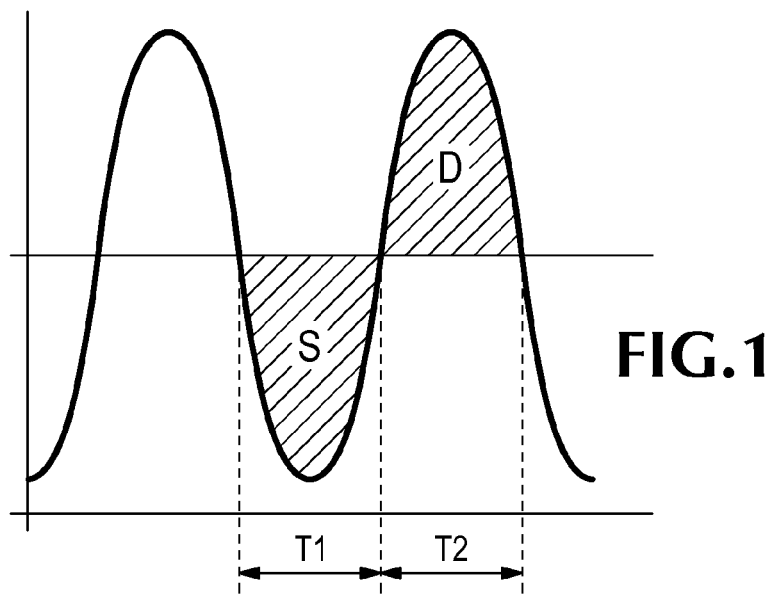
FIG. 1 illustrates the mismatch between a DC power source and a 60 Hz AC load in a power converter.
Figure 2:
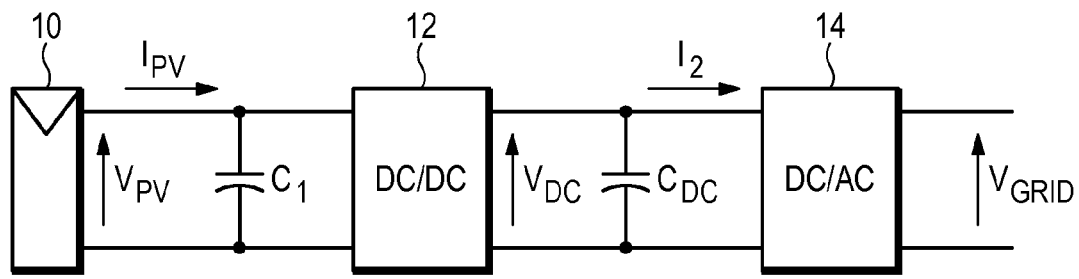
FIG. 2 illustrates a conventional system for converting DC power from a photovoltaic (PV) panel to AC power.

FIG. 2 illustrates a conventional system for converting DC power from a photovoltaic (PV) panel to AC power. The PV panel 10 generates a DC output current $I_{PV}$ at a typical voltage $V_{PV}$ of about 20 volts, but panels having other output voltages may be used. A DC/DC converter 12 boosts $V_{PV}$ to a link voltage $V_{DC}$ of a few hundred volts. A DC/AC inverter 14 converts the DC link voltage to an AC output voltage $V_{GRID}$. In this example, the output is assumed to be 120 VAC at 60 Hz to facilitate connection to a local power grid, but other voltages and frequencies may be used.

The system of FIG. 2 also includes a DC link capacitor $C_{DC}$ and a decoupling capacitor $C_1$. Either or both of these capacitors may perform an energy storage function to balance the nominally steady power flow from the PV panel with the fluctuating power requirements of the grid. Power pulses within the system originate at the DC/AC inverter 14, which must necessarily transfer power to the grid in 120 Hz pulses. In the absence of a substantial energy storage device, these current pulses would be transferred all the way back to the PV panel where they would show up as fluctuations (or "ripple") in the panel voltage $V_{PV}$ and/or current $I_{PV}$. Therefore, the DC link capacitor $C_{DC}$, or less often, the decoupling capacitor $C_1$, is used to store enough energy on a cycle-by-cycle basis to reduce the ripple at the PV panel to an acceptable level.

In conventional systems, however, energy storage capacitors tend to be problematic components for several reasons. First, a capacitor that is large enough to provide adequate energy storage must generally be of the electrolytic type, since other large capacitors are usually prohibitively expensive. This may be better understood in the context of an example system that is designed to convert 210 watts of input power from a PV panel to 120 VAC at 60 Hz. The energy storage $\Delta E$ required to balance the power on a cycle-by-cycle basis is given by:

$$\Delta E = \frac{P}{2\omega} \quad \text{(Eq. 1)}$$

where P is the power in watts (W), $\omega$ is the angular frequency of the AC sine wave which has units of $\sec^{-1}$, and the energy storage $\Delta E$ has units of Joules (J). At 60 Hz, $\omega = 120\pi$, and thus:

$$\Delta E = \frac{210}{2(120\pi)} \approx 0.3 \text{ J} \quad \text{(Eq. 2)}$$

The amount of energy stored in a capacitor is given by:

$$\Delta E = \frac{1}{2} C [v_{max}^2 - v_{min}^2] \quad \text{(Eq. 3)}$$

where C is the capacitance in Farads.

Assuming the energy storage function is performed in the DC link capacitor $C_{DC}$, and the DC link voltage is allowed to have a 5 volt peak-to-peak swing on top of a 495 volt DC level, solving for the capacitance provides the following result:

$$C = \frac{2(0.3)}{(500)^2 - (495)^2} \approx 120 \text{ μF} \quad \text{(Eq. 4)}$$

A 120 microfarad capacitor at a high enough voltage rating would typically have to be an electrolytic capacitor, since a ceramic capacitor of this size would usually be prohibitively expensive.

Using the decoupling capacitor $C_1$ for energy storage is typically even worse. Since the voltage multiplication from input voltage $V_{PV}$ to the link voltage $V_{DC}$ is about 25 to 1, a 5 volt peak-to-peak ripple on the DC link would equate to a 0.2 volt ripple on the decoupling capacitor. Solving again for the capacitance yields:

$$C = \frac{2(0.3)}{(20)^2 - (19.8)^2} \approx 75 \text{ mF} \quad \text{(Eq. 5)}$$

A 75 mF (75,000 microfarad) capacitor would almost certainly need to be of the electrolytic type.

Electrolytic capacitors, however, have limited life spans and tend to have a high failure rate. As a further complication, the capacitance of an electrolytic capacitor steadily decreases over its lifetime as the electrolyte dissipates and/or deteriorates, thereby reducing its effectiveness and changing the dynamics of the entire system. Further, electrolytic capacitors tend to be bulky, heavy and fragile, and have a large equivalent series resistance (ESR).

As is apparent from the equations above, performing the energy storage function on the DC link capacitor rather than the decoupling capacitor may be beneficial because it typically reduces the size of the required capacitor. In general, it is more economical to store energy in the form of a higher voltage on a small capacitor than a lower voltage on a larger capacitor. However, even in a conventional system that stores energy on the DC link, the capacitor is an expensive, bulky and unreliable component that often forms the weakest link in a power conversion system.

Figure 3:
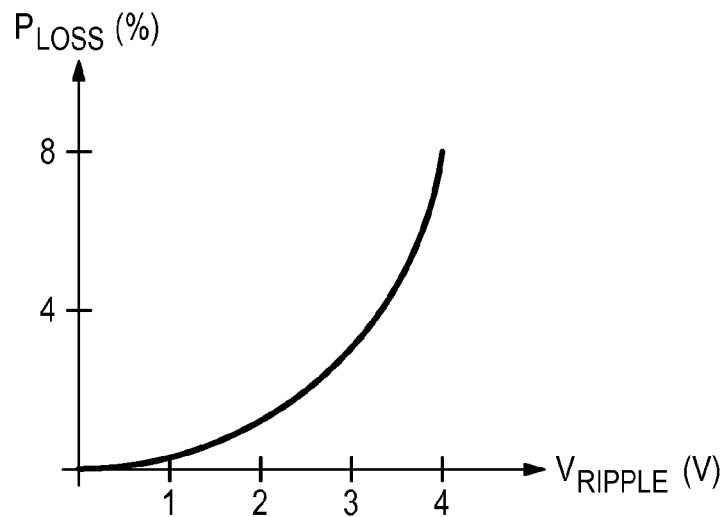
FIG. 3 illustrates power loss versus ripple voltage in a PV panel.
Figure 4:
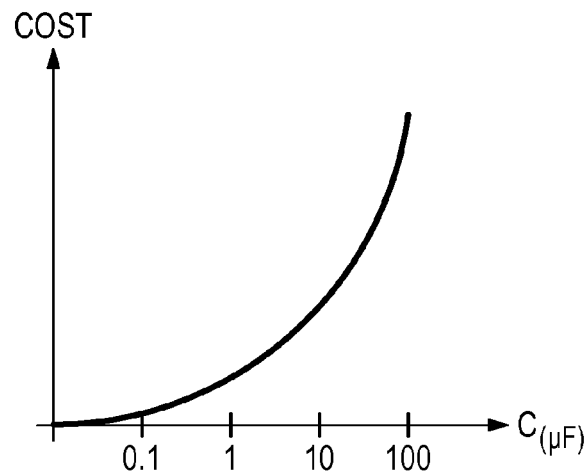
FIG. 4 illustrates cost versus capacitance for a capacitor.

Moreover, sizing a capacitor for energy storage in a conventional system presents some difficult design trade-offs. For example, even with a large capacitor, a certain amount of ripple remains in the PV current and/or voltage. As shown in FIG. 3, even small amounts of ripple cause significant power losses which reduce the efficiency of the system. The ripple can be reduced by using a larger capacitor, but as shown in FIG. 4, increasing the size of a capacitor dramatically increases its cost.

Power Control

Figure 5:
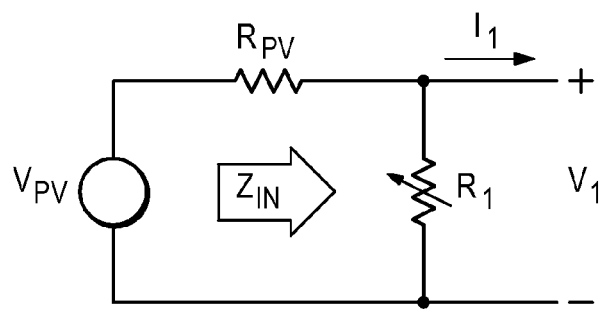
FIG. 5 illustrates the operation of a PV power conversion system.
Figure 6:
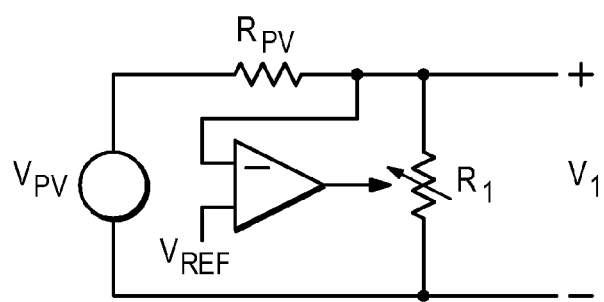
FIG. 6 illustrates the operation of a power conversion system having constant power control according to some of the inventive principles of this patent disclosure.

Some of the inventive principles of this patent disclosure relate to power control techniques that may fundamentally alter the dynamics of the interface between a power converter and a power source. Some of these principles relate to maintaining a controlled impedance looking into the power converter. Referring to FIG. 5, a PV panel may be modeled as a voltage source $V_{PV}$ and a series resistance $R_{PV}$. The system includes a variable resistance $R_1$ that is controlled so that the impedance $Z_{IN}$ looking into the power converter remains constant regardless of the current $I_1$ that is transferred from the PV panel to the power converter. In one example implementation, the variable resistance $R_1$ may be controlled by nulling the difference between the input voltage $V_1$ and a reference voltage $V_{REF}$ as shown in FIG. 6.

Figure 7:
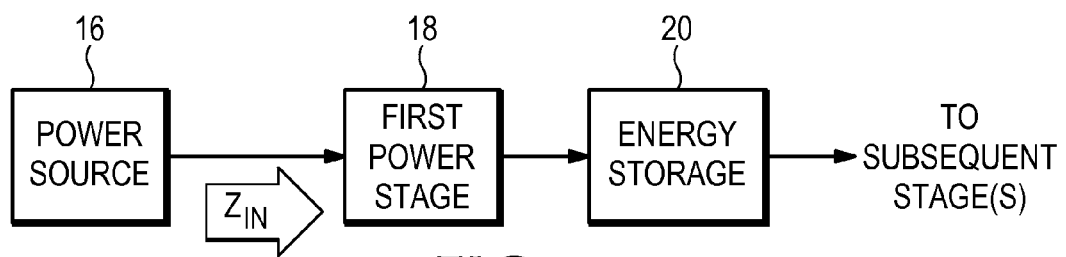
FIG. 7 illustrates an embodiment of a power conversion system having constant power control according to some of the inventive principles of this patent disclosure.

Some of the inventive principles involve the relationship between impedance control and energy storage functions in a power converter. For example, in the embodiment of FIG. 7, the impedance $Z_{IN}$ looking into a first power converter stage 18 is maintained at a controlled value. One or more energy storage devices 20 balance the instantaneous input power from the power source 16 with the instantaneous output power, which may flow through one or more subsequent power stages. The power source 16 may include a PV panel, fuel cell, battery, wind turbine, etc. The first stage 18 may include one or more DC/DC converters, DC/AC inverters, rectifiers, etc. The energy storage device may include one or more capacitors, inductors, etc. The subsequent stages may include one or more DC/DC converters, DC/AC inverters, rectifiers, etc.

In one example embodiment, the power source 16 includes a PV panel, the first stage 18 includes a DC/DC converter, and the energy storage device includes a link capacitor. The impedance $Z_{IN}$ looking into the first power converter stage is maintained at a constant value, while the voltage on the link capacitor is allowed to fluctuate in response to the pulsating power demands of a subsequent stage. Because the input impedance control isolates the PV panel from the link capacitor, the voltage swing on the link capacitor may be much greater than in a system without impedance control. This may enable the size of the link capacitor to be reduced because the amount of energy stored in a capacitor is directly related to the voltage swing across the capacitor. It may also eliminate or reduce the size of a decoupling capacitor at the input.

Figure 8:
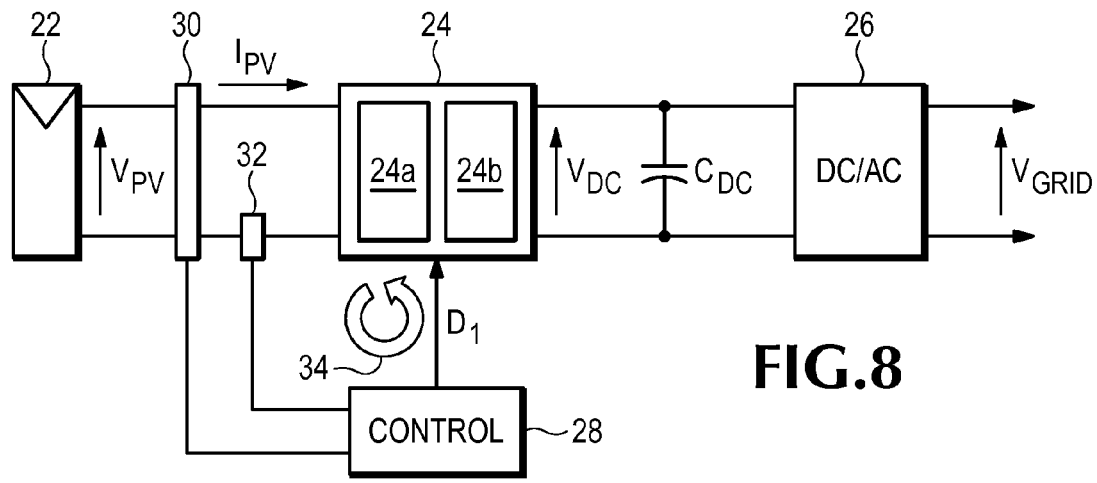
FIG. 8 illustrates another embodiment of a power conversion system according to some of the inventive principles of this patent disclosure.

FIG. 8 illustrates another embodiment of a power conversion system according to some of the inventive principles of this patent disclosure. The system of FIG. 8 receives power from photovoltaic cells in a PV panel 22. The system includes a DC/DC converter 24, a link capacitor $C_{DC}$, a DC/AC inverter 26, and a controller 28. The DC/DC converter may include one or more stages such as buck converters, boost converters, push-pull stages, rectifiers, etc., arranged as pre-regulators, main stages, etc. For purposes of illustration, the DC/DC converter in this example is assumed to have a pre-regulator stage 24a followed by a main stage 24b, but the inventive principles are not limited to such an arrangement. The DC/AC inverter 26 may include any suitable inverter topology such as an H-bridge, a resonant inverter, etc. Voltage and current sensors 30 and 32 provide signals indicating the PV panel output voltage $V_{PV}$ and current $I_{PV}$, respectively, to the controller 28. The controller outputs a drive signal D1 to control the pre-regulator.

Controller 28 implements a constant power control loop (shown conceptually by arrow 34) by controlling the pre-regulator stage 24a in the DC/DC converter in such a manner as to maintain the PV panel output voltage $V_{PV}$ or current $I_{PV}$ at a substantially constant value that eliminates or reduces input ripple. This causes the PV panel to see an essentially constant load which therefore results in constant power transfer. In essence, the constant power control loop isolates the PV panel from any stages after the preregulator 24a, so the energy storage device or devices may be arranged anywhere downstream of the constant power control loop. In the example of FIG. 8, the link capacitor is used for energy storage to provide cycle-by-cycle power balance at the AC output frequency. In other embodiments, however, the energy storage may be located between the preregulator and the main stage, or in any other additional stages downstream of the constant power control loop.

Because a constant power control loop isolates the power source from downstream energy storage devices, the energy storage devices may be allowed to operate with wider fluctuations than would otherwise be acceptable. For example, capacitors may operate with larger voltage fluctuations, and inductors may operate with larger current fluctuations. This, in turn, may enable the use of smaller energy storage devices.

Constant power control is distinct from, but may be used in conjunction with, maximum power point tracking (MPPT) according to some of the inventive principles of this patent disclosure. Whereas MPPT may seek to determine an operating point that maximizes the power available from the power source under certain operating conditions, constant power control may enable the system to maintain an operating point despite fluctuations in a load. For example, in some embodiments, MPPT techniques may be used to find an operating point for the system, whereas constant power control techniques may be used to keep it there as explained in more detail below with reference to FIG. 22.

Regulating a constant DC input voltage or current may provide several advantages. First, reducing ripple in the input waveform improves the efficiency of some DC power sources such as PV panels which suffer from resistive losses related to the ripple. Second, moving the energy storage to the DC link capacitor may eliminate the need for an input electrolytic capacitor which is an expensive, bulky and unreliable component with a short lifespan. Instead, the energy may be stored in a higher voltage form on the DC link capacitor which is less expensive, more reliable, has a longer lifespan and may take up less space. Moreover, the size of the DC link capacitor itself may also be reduced.

In the example embodiment described above with respect to FIG. 8, the controller has one sense input (either $V_{PV}$ or $I_{PV}$) and one control output (D1) which controls the pre-regulator in the DC/DC converter. That is, the constant power control loop is implemented by controlling the first stage in the power path in response to a parameter sensed at the overall input of the power converter system.

Some additional inventive principles of this patent disclosure enable the implementation of constant power control by (1) controlling one or more power stages other than the first stage in response to a parameter sensed anywhere in the system; and/or (2) by controlling any power stage or stages in response to one or more parameters sensed anywhere in the system other than at the overall input.

For example, according to some of these additional inventive principles, the embodiment of FIG. 8 may be modified so that the controller 28 implements a constant power control loop by controlling the pre-regulator 24a in response to a parameter sensed at the output of the DC/AC inverter 26. As another example, the system of FIG. 8 may be modified so that the controller 28 implements a constant power control loop by controlling the DC/AC inverter 26 in response to the input voltage $V_{PV}$.

Figure 9:
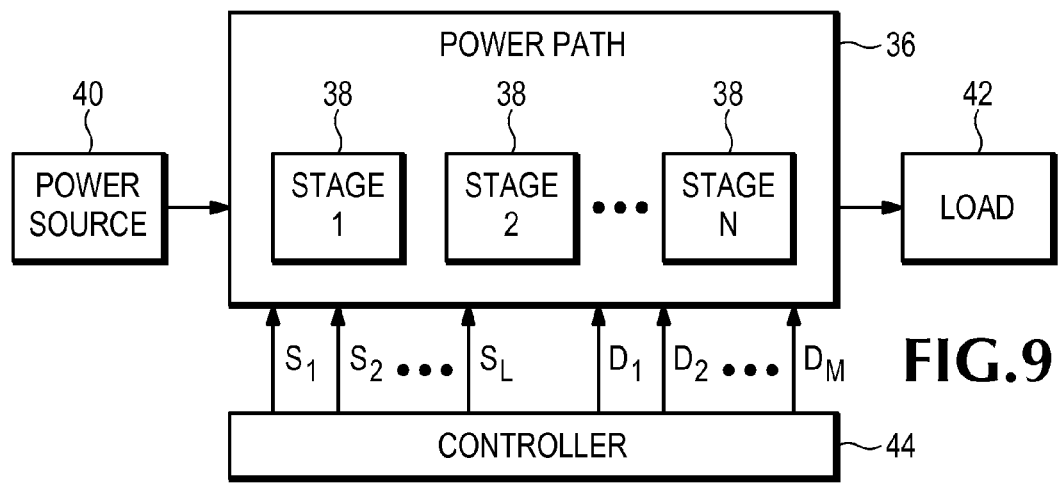
FIG. 9 illustrates another embodiment of a power conversion system having constant power control according to some inventive principles of this patent disclosure.

FIG. 9 illustrates another embodiment of a power conversion system having constant power control according to some inventive principles of this patent disclosure. A power path 36 includes N power stages 38, where N≥1. The power path receives power from power source 40 and outputs power to load 42. A controller 44 receives one or more sense signals $S_1$, $S_2 \ldots S_L$ from the power path and outputs one or more drive signals $D_1, D_2 \ldots D_M$ to the power path. The power stages 38 may include one or more DC/DC converters, DC/AC inverters, rectifiers, energy storage devices, etc. for processing the power as it is converted from the form provided by the power source 40 to the form delivered to the load 42. The one or more sense signals $S_1, S_2 \ldots S_L$ may be taken from the inputs and/or outputs of any of the power stages, from points within the power stages, and/or from points between the power stages. The one or more drive signals $D_1, D_2 \ldots D_M$ may be arranged to control one, any or all of the power stages or portions of the power stages. A drive signal may be arranged to control more than one drive stage or portions of one or more drive stages in unison.

The controller 44 implements a constant power control loop using at least one sense signal from a point other than the overall input to the power path and/or at least one drive signal that drives at least one power stage other than the first stage.

In some instances, providing constant power control may involve maintaining a parameter at a constant value, for example, maintaining the overall input voltage to the power converter system at a constant value. In other instances, constant power control may involve controlling a parameter to have a dynamic characteristic, for example, by controlling the AC voltage swing on a link capacitor to have a sinusoidal waveform. In some embodiments, some stages may be left free-running, e.g., uncontrolled, open loop, fixed pulse width PWM, etc., while in other embodiments, some form of closed loop control may be applied to every stage.

In some embodiments, constant power control may involve regulating the value of one or more sensed parameters, for example, regulating the value of the input voltage sensed at the input of the system. In some embodiments, the controller may use one or more additional sensed parameters as feedback signals, alone or in combination with other sensed parameters. In other embodiments, one or more additional sensed parameters may be used as feedforward signals, alone or in combination with other sensed parameters.

In FIG. 9, the power stages in the power path are shown generally in a row, but stages are not required to be in series. Some stages may be arranged in parallel, in series-parallel combination, or in any other suitable configuration in accordance with the inventive principles, although at least one first stage is coupled to the overall input of the power path.

Moreover, rather than directly regulating the input to null the ripple, ripple at an energy storage device elsewhere in the system may be controlled to produce the same effect at the input.

Figure 10:
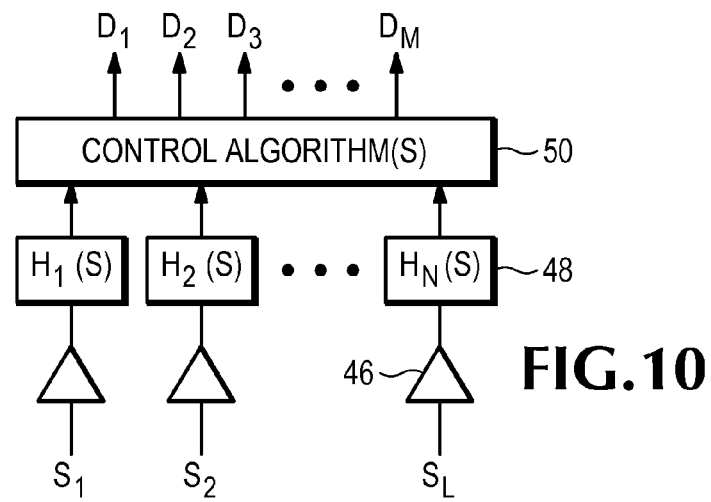
FIG. 10 illustrates an embodiment of a controller for implementing constant power control according to some inventive principles of this patent disclosure.

FIG. 10 illustrates an embodiment of a controller for implementing constant power control according to some inventive principles of this patent disclosure. The controller receives one or more sense signals $S_1, S_2 \ldots S_L$ from one or more sense circuits which may be simple ohmic connections, current shunts, Hall-effect sensors, bridge circuits, transformers, etc. One or more amplifier/buffer circuits 46 may be used to condition the sense signals before they are applied to one or more control blocks 48, each of which implements a function $H_1(s), H_2(s) \ldots H_L(s)$.

The outputs from the control blocks are applied to a control algorithm section 50 which implements one or more control algorithms to generate the output drive signals $D_1, D_2 \ldots D_M$. The one or more control blocks 48 and/or control algorithm section 50 may be implemented in hardware, software, firmware, etc., or any combination thereof. Hardware may be realized with analog circuitry, digital circuitry, or any combination thereof.

Figure 11:
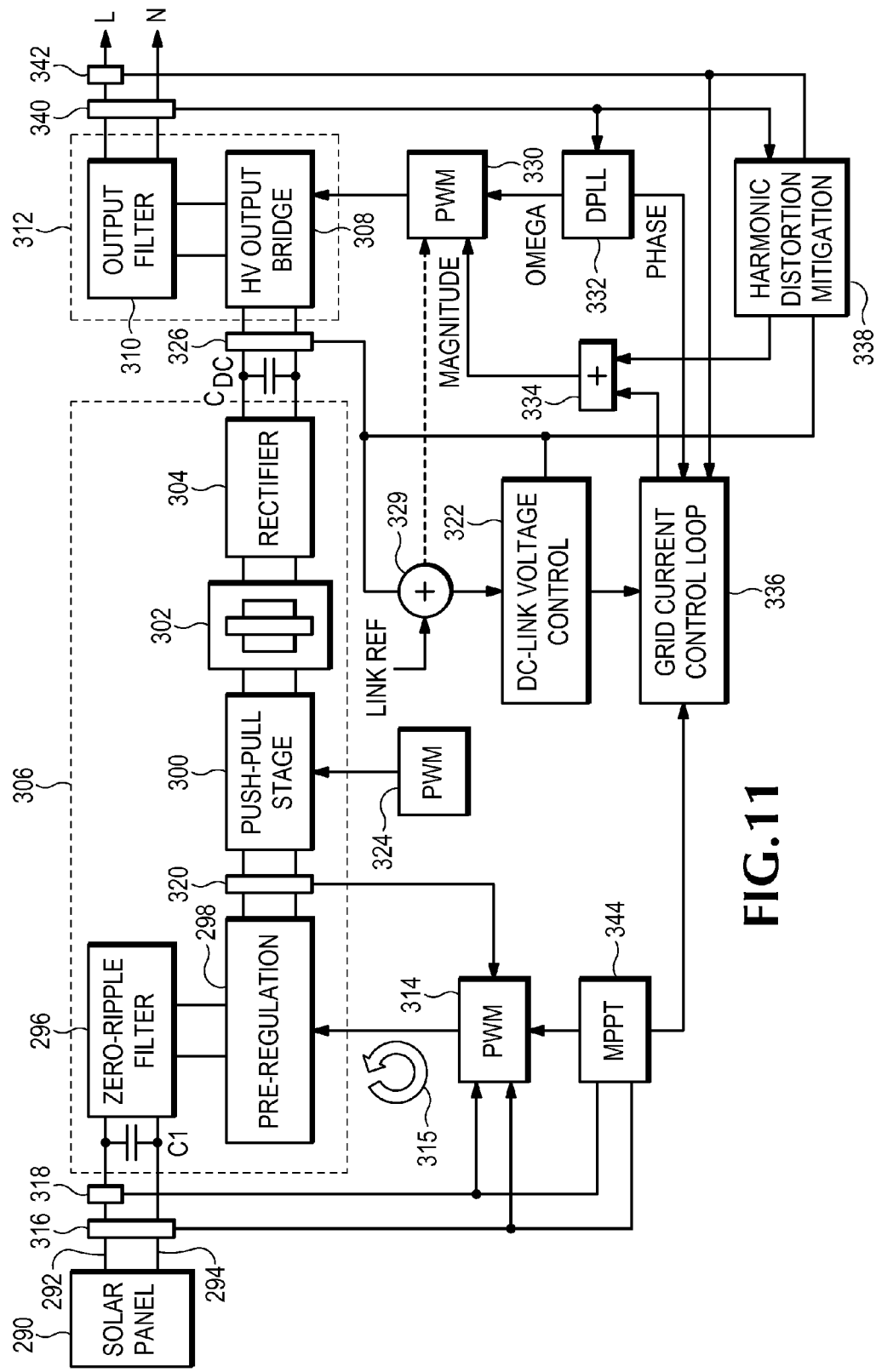
FIG. 11 illustrates an embodiment of a power converter system according to some of the inventive principles of this patent disclosure.

FIG. 11 illustrates an embodiment of a power converter system according to some of the inventive principles of this patent disclosure. DC power is applied to the system at terminals 292 and 294. The embodiment of FIG. 11 is shown in the context of a solar panel 290, but it may be utilized with other DC power sources such as fuel cells, batteries, capacitors, etc. In this example, the main power path continues through a collection of components that form a DC-DC converter 306. The DC-DC converter transforms the DC power from relatively low voltage and high current, which is characteristic of PV panels having crystalline cells and some other DC power sources, to relatively higher voltage and lower current suitable for conversion to AC power in a form that can be easily distributed to a local user and/or transmitted to remote users through a power grid, etc. In other embodiments, for example, systems based on thin-film PV cells, the DC power may be generated at higher voltages, thereby eliminating or reducing the need or usefulness of voltage boosting, pre-regulation, etc. In this embodiment, the DC-DC converter is shown with two stages: a boost-type pre-regulator and a push-pull type main stage. In other embodiments, however, the DC-DC converter may be implemented with any suitable arrangement of single or multiple stages.

Referring again to FIG. 11, a zero-ripple input filter 296, for example a passive filter, may be utilized to reduce high frequency (HF) ripple for improved efficiency. Depending on the implementation, the benefit of the zero ripple filter may not be worth the additional cost.

Pre-regulator 298 may enable the system to operate from a wider range of input voltages to accommodate PV panels from different manufacturers. The pre-regulator may also facilitate the implementation of an advanced control loop to reduce input ripple as discussed below. The pre-regulator may be implemented, for example, as a high-frequency (HF) boost stage with soft switching for high efficiency and compact size. In this example, the pre-regulator provides a modest amount of initial voltage boost to feed the next stage. However, other pre-regulator stages such as buck converters, buck-boost converters, push-pull converters, etc., may be used as a pre-regulator stage.

Push-pull stage 300 provides the majority of the voltage boost in conjunction with a transformer 302 and rectifier 304. The use of a push-pull stage may facilitate the implementation of the entire system with a single integrated circuit since the drivers for both power switches may be referenced to the same common voltage. The output from the rectifier stage 304 is applied to a DC link capacitor $C_{DC}$ which provides a high voltage DC bus to feed the DC-AC inverter stage 312.

The inverter stage 312 includes a high voltage output bridge 308 which, in this embodiment, is implemented as a simple H-bridge to provide single-phase AC power, but multi-phase embodiments may also be implemented. A passive output filter 310 smoothes the waveform of the AC output before it is applied to a load or grid at the neutral and line output terminals L and N.

A first (input) PWM controller 314 controls the pre-regulator 296 in response to various sense inputs. In the embodiment of FIG. 11, voltage sensors 316 and 320 and current sensor 318 provide a measure of the overall input voltage and current and the output voltage of the pre-regulator, respectively. However, the first PWM controller may operate in response to fewer or more sense inputs. For example, any of these sense inputs may be omitted and/or other sense inputs may be included, e.g., the voltage on DC link capacitor $C_{DC}$, or currents measured at any other points along the power path.

As explained above, power is preferably drawn from the DC source at a constant rate, whereas the instantaneous AC power output fluctuates between zero and some maximum value at twice the AC line frequency. To prevent these AC power fluctuations from being reflected back to the DC power source, an energy storage capacitor is used to store energy during troughs (or "valleys") in the AC line cycle, and release energy during peaks in the AC line cycle. This is conventionally accomplished through the use of a large electrolytic capacitor for the DC link capacitor $C_{DC}$, which is held at a relatively constant value with a small amount of ripple.

In some embodiments, the first PWM controller 314 implements an inner constant power control loop as described above (and shown conceptually by arrow 315) by controlling the pre-regulator 296 to maintain a constant voltage at the input terminals 292 and 294. If the power available from the PV panel is constant, then maintaining a constant panel voltage results in constant output current from the panel as well. Alternatively, the controller may regulate the current rather than the voltage. The constant power control loop prevents ripple on the DC link capacitor from being reflected back to the input. Thus, the voltage swing on the DC link capacitor may be increased and the size of the capacitor may be reduced, thereby enabling the use of a capacitor that is more reliable, smaller, less expensive, etc.

A maximum power point tracking (MPPT) circuit 344 forms an outer control loop to maintain the average input voltage and current, sensed by voltage and current sensors 316 and 318, respectively, at the optimum points to maximize the output power available from the DC power source, which in this example, is a PV panel.

A second (push-pull) PWM controller 324 controls the push-pull stage, which in this embodiment, operates at a fixed duty cycle. A summing node 329 compares the DC link voltage from sensor 326 to a link reference voltage LINK REF and applies the output to a link voltage control circuit 322. Alternatively, the output of the summing node 329 may be applied to the third (output) PWM controller 330 to enable the output section to control the link voltage.

The DC-link voltage controller 322 may operate in different modes. In one mode, it may simply allow the output from the summing node 329 to be applied to the PWM circuit, thereby causing the DC-link voltage to be regulated to a constant value. However, if used in conjunction with the input ripple reduction loop discussed above, the DC-link voltage controller 322 may filter out the AC ripple so that the third PWM loop only regulates the long-term DC value (e.g., the RMS value) of the DC-link voltage. That is, the AC ripple on the DC-link capacitor rides on a DC pedestal that slides up or down in response to the DC-link voltage controller. This may be useful, for example, to control distortion in the AC output power as discussed below.

A third (output) PWM controller 330 controls the four switches in the H-bridge 308 to provide a sinusoidal AC output waveform. A non-DQ, non-cordic polar form digital phase locked loop (DPLL) 332 helps synchronize the output PWM to the AC power line. The overall AC output is monitored and controlled by a grid current control loop 336 which adjusts the third PWM controller 330 in response to outputs from the MPPT circuit, the DC-link voltage controller, the DPLL, and the output voltage and/or current. A harmonic distortion mitigation circuit 338 further adjusts the output PWM through a summing circuit 334 to eliminate or reduce distortion in response to the output voltage and current waveforms sensed by voltage and current sensors 340 and 342, respectively. An output from the harmonic distortion mitigation circuit may additionally be applied to the grid current control loop 336.

An output signal from the harmonic distortion mitigation circuit 338 may also be applied to the DC-link voltage controller for optimization of the DC-link voltage. In general, it may be preferable to minimize the DC-link voltage to increase overall efficiency. However, if the troughs of the voltage excursions on the DC-link capacitor fall too low, it may cause excessive distortion in the AC output. Thus, the DC-link voltage controller may slide the DC pedestal on the DC-link capacitor up or down to maintain the bottoms of the AC troughs at the lowest point possible while still holding distortion to an acceptable level as indicated by the harmonic distortion mitigation circuit.

In some alternative embodiments, the DC-link voltage controller 322 may provide a feedback signal which is compared to a reference signal and applied to the second PWM controller 324, which may then control the DC link voltage by adjusting the PWM to the push-pull stage.

Figure 12:
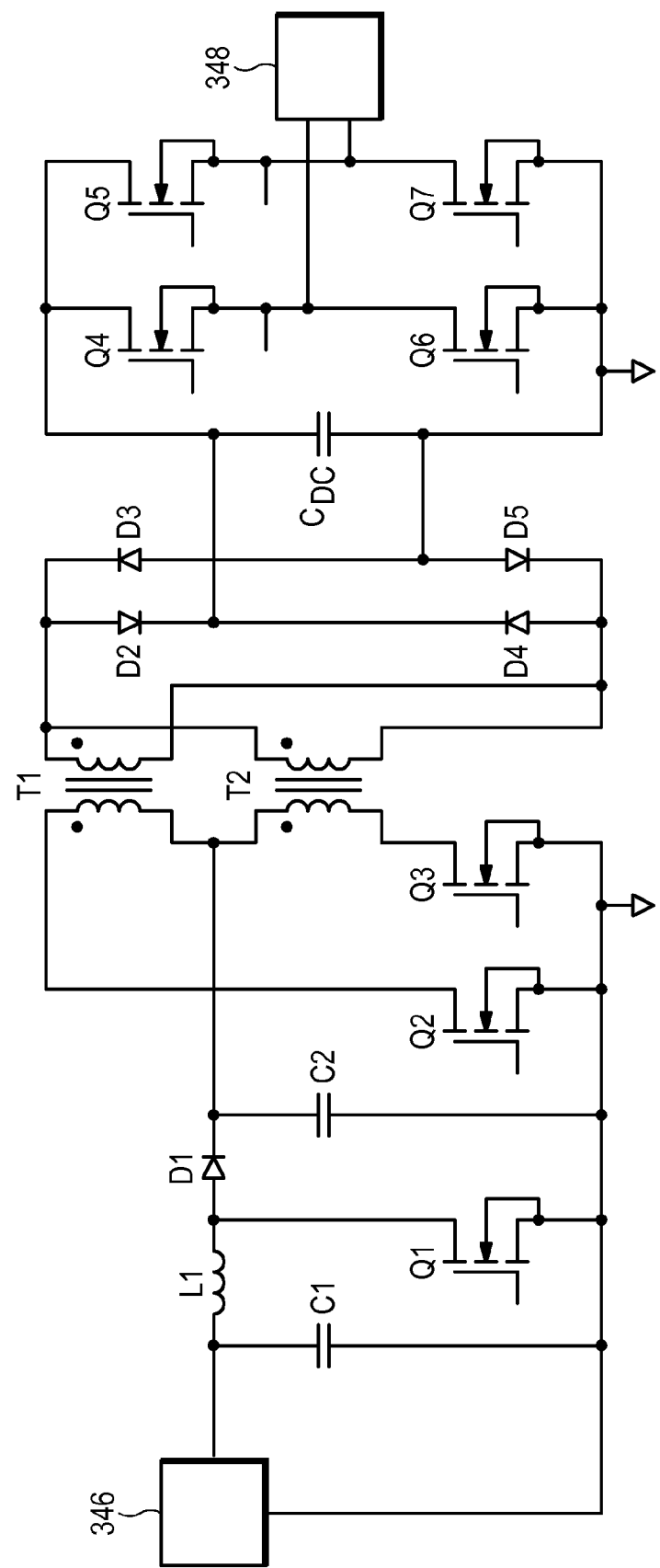
FIG. 12 is a schematic diagram of an embodiment of a main power path suitable for implementing the inverter system of FIG. 11 according to some of the inventive principles of this patent disclosure.

FIG. 12 is a schematic diagram of an embodiment of a main power path suitable for implementing the inverter system of FIG. 11 according to some of the inventive principles of this patent disclosure. Power from DC power source 346 is applied to the system at capacitor $C_1$ which may be a large energy storage capacitor, or if the input ripple reduction control loop is used, a smaller filter capacitor to prevent HF switching transients from being fed back into the DC power source. Inductor L1, transistor Q1 and diode D1 form the pre-regulation boost converter which is controlled by the input PWM controller.

The output from the boost converter appears across capacitor C2 which may provide HF filtering and/or energy storage depending on the implementation. The push-pull stage includes transistors Q2 and Q3 which alternately drive a transformer in response to the push-pull PWM controller. The transformer may be a split core type T1,T2 as shown in FIG. 11, a single core type, or any other suitable configuration. The transformer has an appropriate turns ratio to generate a high-voltage DC bus across the DC-link capacitor $C_{DC}$ to adequately feed the output bridge. Depending on the implementation, the transformer may also provide galvanic isolation between the input and output of the inverter system. The rectifier may include passive diodes D2-D5 as shown in FIG. 12, active synchronous rectifiers, or any other suitable arrangement.

Transistors Q4-Q7 in the HV output bridge are controlled by the output PWM controller to generate the AC output which is filtered by grid filter 348 before being applied to the load or power grid.

An advantage of the embodiment of FIG. 12 is that it is readily adaptable to fabrication as an integrated power converter, for example, with a single integrated circuit (IC). Since most of the power switches are referenced to a common power supply connection, isolated drivers are not required for these switches. The combination of a constant power control feature with a push-pull stage and a downstream energy storage device may be particularly beneficial because of the synergistic interaction of components. These benefits may also extend to discrete implementations as well.

In a monolithic implementation of the entire structure, there may be dielectric isolation between the high-side switches in the output H-bridge and their corresponding low-side switches. There may also be isolation between different sections of the system. For example, sense circuitry located in one section may transfer information to processing circuitry in another section that performs control and/or communication and/or other functions in response to the information received from the first section. Depending on the particular application and power handling requirements, all of the components including the power electronics, passive components, and control circuitry (intelligence) may be fabricated directly on the IC chip. In other embodiments, it may be preferable to have the largest passive components such as inductors, transformers and capacitors located off-chip. In yet other embodiments, the system of FIG. 12 may be implemented as a multi-chip solution.

Figure 13:
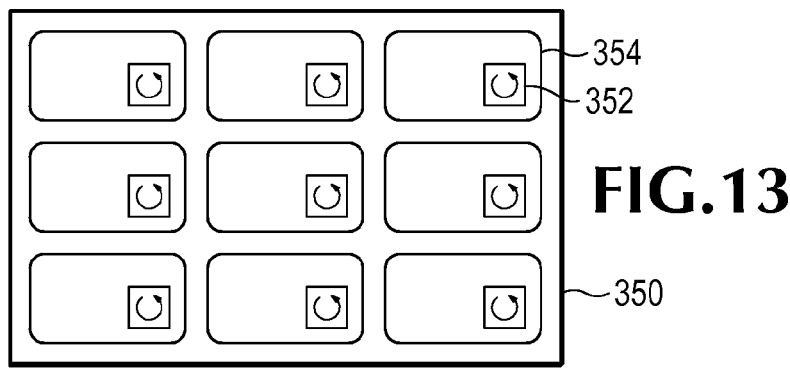
FIGS. 13-16 illustrate embodiments of PV panels according to some of the inventive principles of this patent disclosure.
Figure 14:
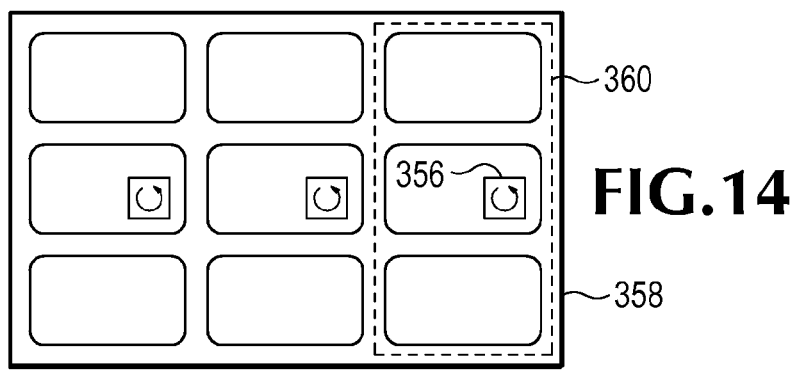
Figure 15:
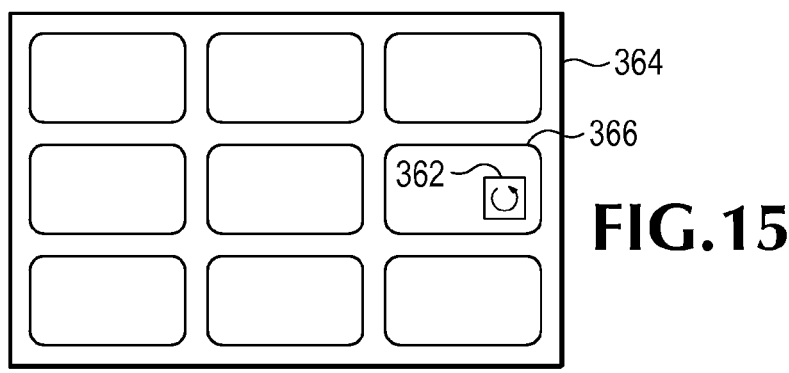
Figure 16:
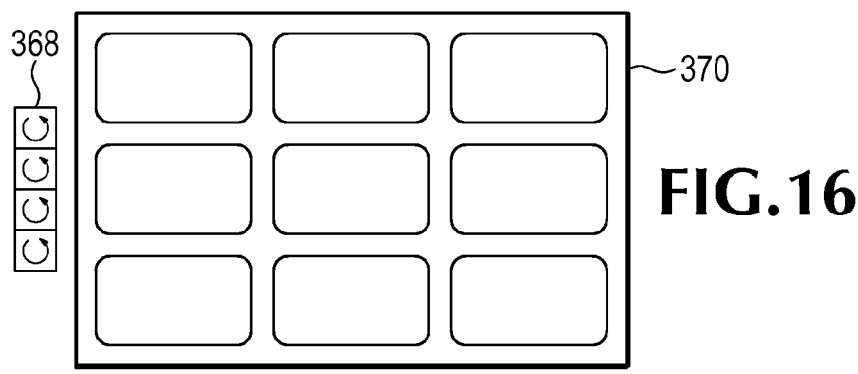

Some additional inventive principles of this patent disclosure relate to integrating constant power control functionality into power sources and/or power conversion systems. In some embodiments, a constant power control apparatus may be integrated into a power source at a lower level such as a cell level, string level, etc. For example, in a PV panel 350 as shown in FIG. 13, one or more constant power control loops 350 may be integrated on each cell 354 on the panel. In another embodiment as shown in FIG. 14, one or more constant power control loops 356 may be integrated on the panel 358 with each string of cells 360. In another embodiment as shown in FIG. 15, a single constant power control loop 362 may be used for the combined output from all of the cells on the panel 364. The single loop 362 may be integrated with one of the cells 366 or separate from any cells. In another embodiment as shown in FIG. 16, multiple constant power control loops 368 may be associated with a panel 370, either integrally or separately from the panel. In other examples, a constant power control loop may be integrated with each cell, either as one or more discrete components associated with each cell, or integrated partially or completely on the same substrate used for each cell. These types of integrated solutions may involve outputs from multiple constant power control loops that may be combined in series, parallel, series-parallel combination, etc.

Some additional inventive principles of this patent disclosure relate to controlling power to a fluctuating value rather than a constant in a power conversion system. For example, in some embodiments, the power may be controlled to any arbitrary function, or to a specific function that is customized to a particular system. In other embodiments, the power may be controlled to a dynamic value that may be synchronized with fluctuations in the power demand of a load, with fluctuations in the power supplied by a source, a combination of both, etc.

Distortion Mitigation

Some additional inventive principles of this patent disclosure relate to techniques for mitigating distortion such as harmonic distortion in a power conversion system. Although some of the principles relating to distortion mitigation are illustrated in the context of embodiments that also include constant power control, the inventive principles relating to distortion mitigation may be applied independently of constant power control and other inventive principles disclosed herein.

Figure 17:
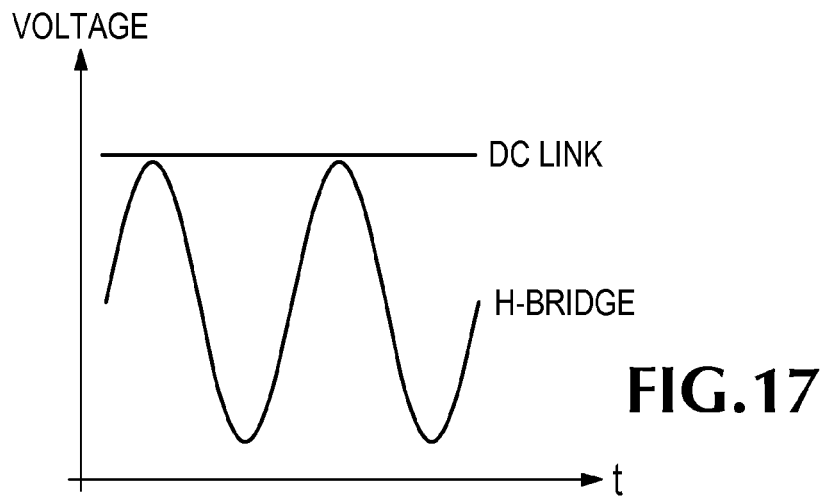
FIG. 17 illustrates the instantaneous demand for voltage from an H-bridge type DC/AC inverter in comparison to the voltage available from a DC link capacitor that is maintained at a fixed voltage.

FIG. 17 illustrates the instantaneous demand for voltage from an H-bridge type DC/AC inverter in comparison to the voltage available from a DC link capacitor that is maintained at a fixed voltage. As long as the DC link voltage is maintained above the peak voltage demand from the inverter (plus an extra amount for headroom), the inverter can produce the AC output with little or no harmonic distortion (HD) in the output voltage and current waveforms.

Figure 18:
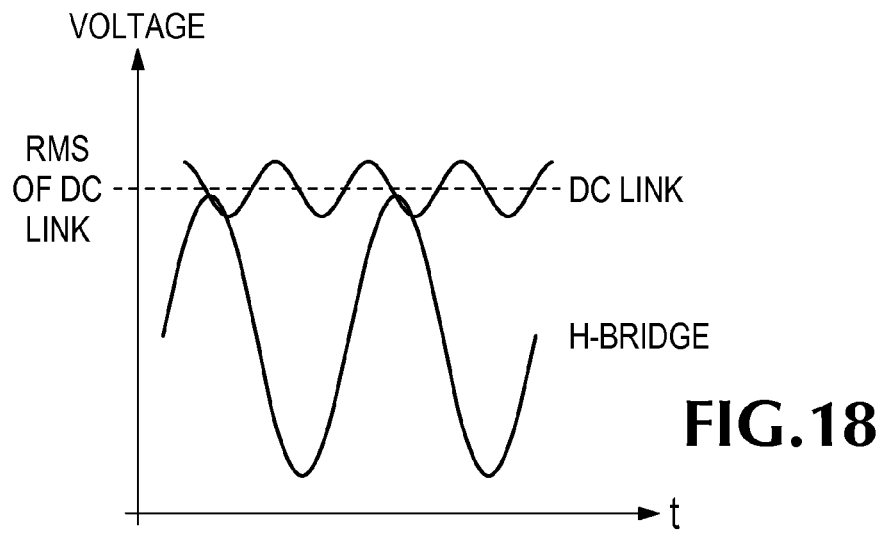
FIG. 18 illustrates the instantaneous demand for voltage from an H-bridge type DC/AC inverter in comparison to the voltage available from a DC link capacitor that has a large AC voltage swing due to a constant power control feature according to some of the inventive principles of this patent disclosure.

FIG. 18 illustrates the instantaneous demand for voltage from an H-bridge type DC/AC inverter in comparison to the voltage available from a DC link capacitor that has a large AC voltage swing due to a constant power control feature as described herein. In general, fluctuations on the DC link voltage may cause distortion in the AC output. Moreover, at certain points in the line cycle, minimums in the voltage available from the link capacitor coincide with peaks in the voltage demand from the inverter. At these points, the AC output voltage and/or current from the inverter may become excessively distorted due to a lack of adequate voltage and headroom to the inverter. In other words, in some embodiments, the inclusion of a constant power feature may cause a certain amount of distortion in the output current, depending on the amount of AC ripple that allowed on the DC link capacitor. Harmonic distortion is particularly troublesome for grid tie applications or any other applications where regulations and/or specifications limit the amount of distortion in the AC output.

Figure 19:
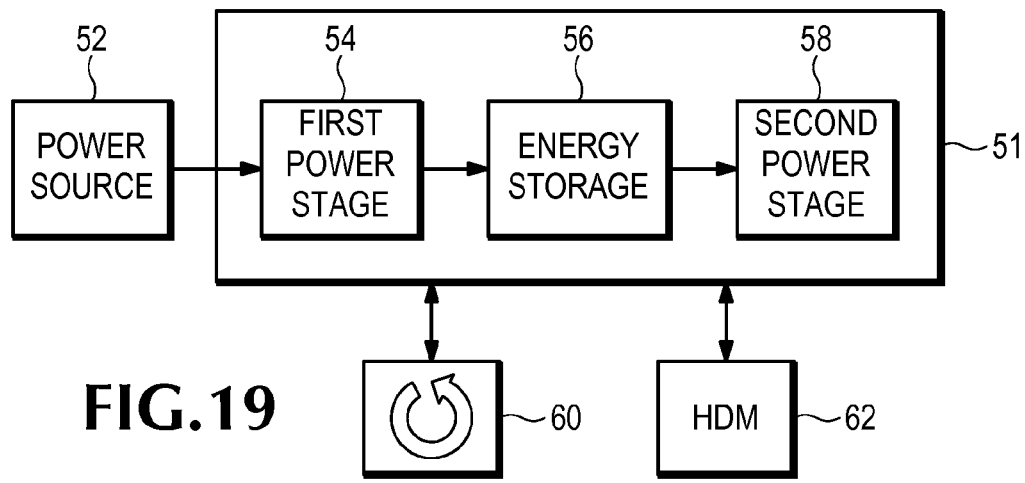
FIG. 19 illustrates an embodiment of a power conversion system having harmonic distortion mitigation according to some of the inventive principles of this patent disclosure.

FIG. 19 illustrates an embodiment of a power conversion system having harmonic distortion mitigation according to some of the inventive principles of this patent disclosure. This embodiment includes a power source 52, and a power path having a first power stage 54, an energy storage element 56 and a second power stage 58. A controller 60 imposes constant power control on the system using one or more sense inputs obtained from any suitable point(s) in the system and one or more drive outputs applied to any suitable point(s) in the system. A harmonic distortion mitigation (HDM) apparatus 62 may use one or more sense inputs obtained from any suitable point(s) in the system and one or more drive outputs applied to any suitable point(s) in the system.

The harmonic distortion mitigation block may implement one or more of numerous different mitigation strategies according to some of the inventive principles of this patent disclosure. One example is illustrated in the embodiment of FIG. 11. As another example, the HDM block may take one or more sense inputs from the input and output of the second power stage 58 and control the first stage 54 and/or second stage 58 in a manner similar to the HDM feature shown in the embodiment of FIG. 11. The HDM functionality may be coordinated with the constant power control functionality, or it may operate independently of the constant power control.

Figure 20:
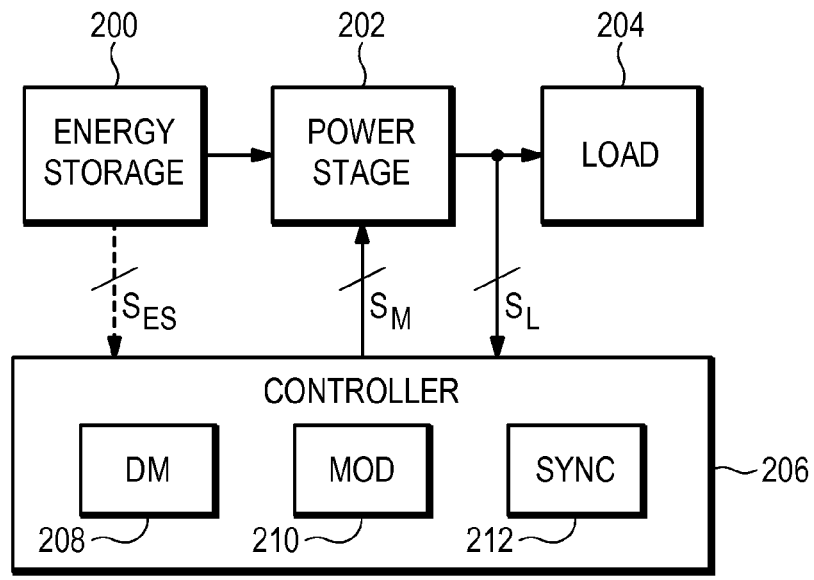
FIG. 20 illustrates an embodiment of a distortion mitigation system according to some of the inventive principles of this patent disclosure.

FIG. 20 illustrates an embodiment of a distortion mitigation system according to some of the inventive principles of this patent disclosure. The embodiment of FIG. 20 includes a power path having an energy storage element 200, a power stage 202 and a load 204. A controller 206 receives one or more load signals $S_L$ that provide information on distortion in the flow of power to the load. One or more control signals, for example, one or more modulation signals $S_M$, enable the controller to control the power stage in a manner that may mitigate distortion. One or more sense signals $S_{ES}$ from the energy storage element provide information that may be used to control one or more parameters of the energy storage element. Though shown coupled to and from specific points in FIG. 20, the signals may be coupled to or from any other suitable points. For example, the one or more load signals $S_L$ are shown originating between the power stage and the load, but they may be taken directly from the power stage, the load, or any other suitable location.

The controller 206 includes a control function such as modulator 210 to control the power stage 202, a synchronization function 212 to synchronize the modulator to the load, and a distortion mitigation function 208 to mitigate distortion in the flow of power to the load. The controller functions may be implemented in hardware, software, firmware, etc., or any combination thereof. Hardware may be realized with analog circuitry, digital circuitry, or any combination thereof. The implementations of the functions may be consolidated in a single apparatus or distributed throughout multiple apparatus, etc.

The energy storage element 200 may include one or more capacitors, inductors, or any other energy storage elements. The power stage 202 may include one or more DC/DC converters, DC/AC inverters, rectifiers, etc. The load may be an AC load, DC load, or any combination thereof. The control function may include any suitable type of modulation function such as pulse width modulation (PWM), pulse frequency modulation (PFM), or any other suitable type of control or modulation function. The synchronization function 212 may include a phase-locked loop (PLL) function, delay locked loop (DLL) function, or any other suitable function to synchronize the control of the power stage with the load. The distortion mitigation function 208 may include harmonic distortion mitigation or cancellation, or any other type of distortion mitigation.

Figure 21:
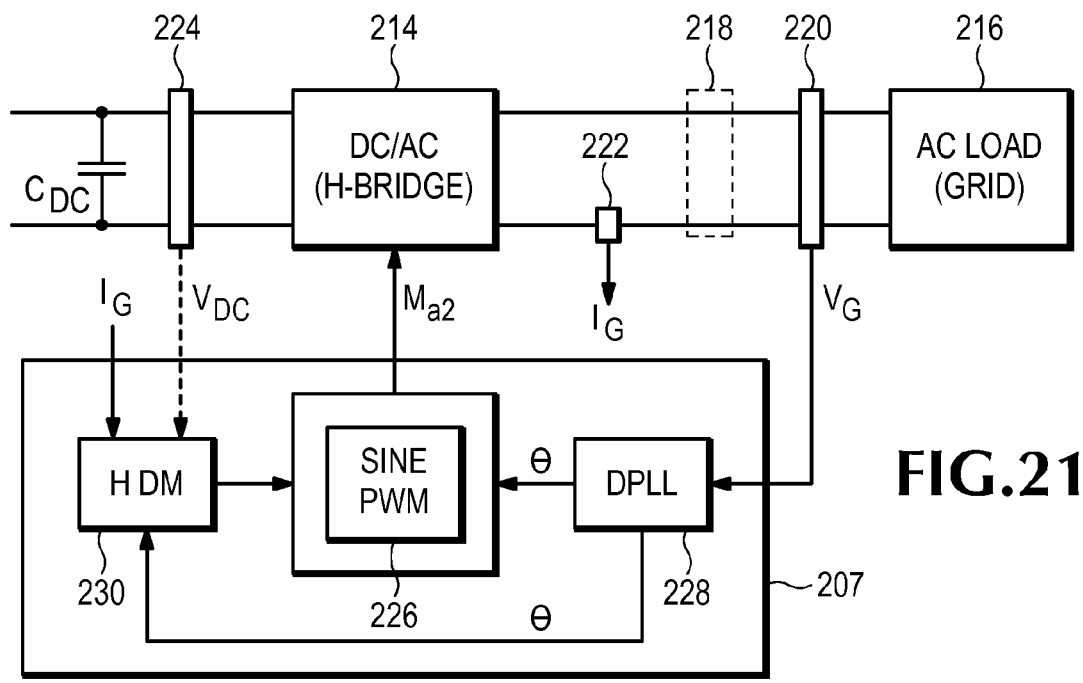
FIG. 21 illustrates another embodiment of a distortion mitigation system showing some example implementation details according to some of the inventive principles of this patent disclosure.

FIG. 21 illustrates another embodiment of a distortion mitigation system showing some example implementation details according to some of the inventive principles of this patent disclosure. In the embodiment of FIG. 21, the energy storage element includes a capacitor $C_{DC}$ having a fluctuating voltage that may be caused, for example, by a constant power control. The power stage 214 includes a DC/AC inverter, which in this example, includes an H-bridge. The load 216 may include any type of AC load, but in this example, it is assumed to include a power distribution grid that operates on conventional sinusoidal AC waveforms. A grid filter 218 may be included between the H-bridge and the grid.

In this example, the controller 207 receives a link voltage $V_{DC}$ which is obtained from the capacitor $C_{DC}$ by a voltage sensor or connection 224. A PWM modulation signal ma2 is provided to the H-bridge from the controller 207. Load signals include the grid current $I_G$ obtained from a current sensor or connection 222, and the grid voltage $V_G$ obtained from a voltage sensor or connection 220.

The controller of FIG. 21 includes a Sine PWM element 226 to a generate pulse width modulation signal Ma2 that causes the H-bridge to produce a sinusoidal AC output. Although this embodiment is directed to sinusoidal waveforms, other types of AC waveforms may be utilized in other embodiments. The synchronization function is performed by a digital phase-locked loop 228 that generates a phase signal θ in response to the grid voltage $V_G$. The distortion mitigation function is performed by a harmonic distortion cancelation HDC element 230 that generates a magnitude signal Ma in response to the grid current $I_G$, and the phase signal θ. The HDC element may optionally include a link voltage control feature that operates in response to the link voltage $V_G$. The outputs from the HDC element and the DPLL are applied to the Sine PWM element 226 which generates the modulation signal Ma2 for controlling the H-bridge. The outputs from HDC element and the DPLL may be applied directly to the Sine PWM element 226, or through other combinations of elements. For example, in other embodiments, the signal Ma may not be applied directly to the Sine PWM element 226, but instead may be combined with the output of the Sine PWM element in an adder.

The selection and arrangement of functions within the controller 207 are subject to countless variations according to some of the inventive principles of this patent disclosure. Some examples are described below by way of example.

Figure 22:
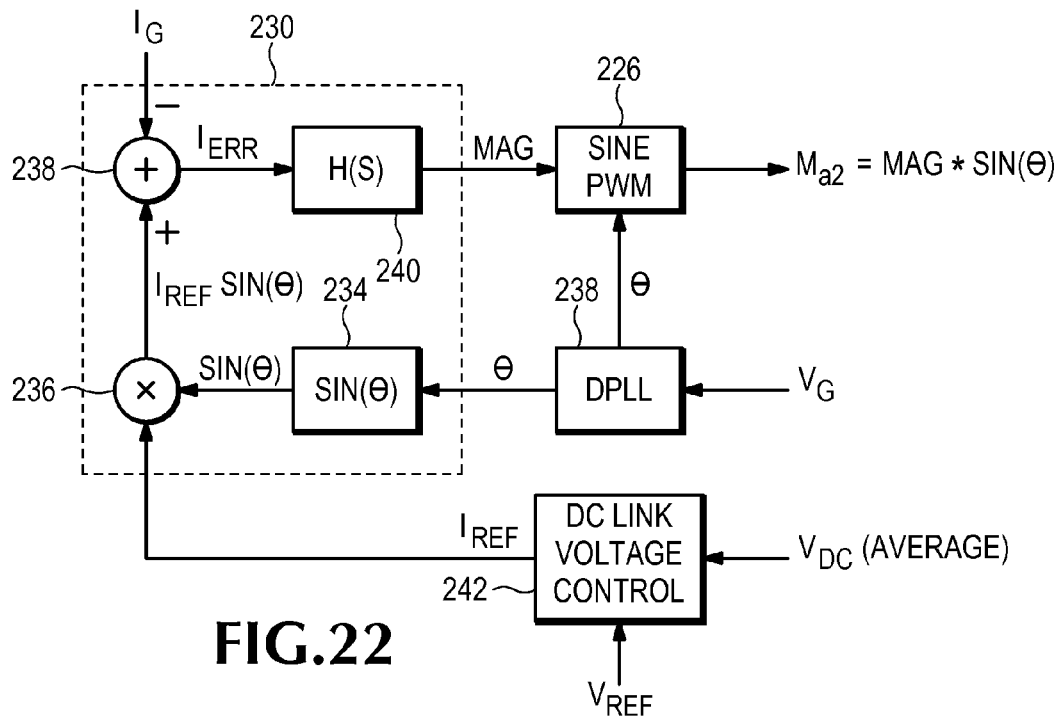
FIG. 22 illustrates another embodiment of a controller having harmonic distortion mitigation according to some of the inventive principles of this patent disclosure.

FIG. 22 illustrates another embodiment of a controller having harmonic distortion mitigation according to some of the inventive principles of this patent disclosure. In the embodiment of FIG. 22, the HDC element 230 includes a sine generator 234 which generates a sine signal sin(θ) in response to the phase signal θ from the DPLL. The signal sin(θ) is combined with a reference signal $I_{REF}$ by multiplier 236 to generate a scaled signal $I_{REF}$ sin(θ) that is compared to the grid current $I_G$ by adder (or comparator) 238 to generate an error signal $I_{ERR}$. The error signal may be subjected to a transfer function H(s) by function block 240 to generate the error magnitude signal MAG.

The embodiment of FIG. 22 implements a direct method of controlling the power stage where the grid current is compared to the scaled sinusoidal signal $I_{REF}$ sin(θ). The resulting output Ma2 from the Sine PWM 226 has the form Ma2=MAG·sin(θ). In operation, the MAG portion may exhibit distortion as a function of time as the control loop tries to maintain a purely sinusoidal output despite the presence of ripple on the link voltage. The system's ability to mitigate harmonic distortion may depend on the bandwidth of the path including the comparator 238, function 240, and Sine PWM 226, which form a loop with the H-bridge and grid filter if present. This loop will typically cancel out harmonics at frequencies below the bandwidth of the loop, for example, an order of magnitude lower. Thus, the path including the comparator, H(s), and Sine PWM may form a relatively fast inner loop, whereas the path including the DPLL 228 and sine generator 234 may form a slower outer loop.

The reference signal $I_{REF}$ may be a fixed reference signal. Alternatively, as shown in FIG. 22, $I_{REF}$ may be provided by a DC link voltage control feature 242 as part of another control loop to control the DC link voltage. The link voltage $V_{DC}$, or an average or RMS version of $V_{DC}$, may be compared to a reference signal $V_{REF}$ to generate $I_{REF}$. The DC link voltage control may be implemented as another relatively slow outer control loop.

Some additional inventive principles of this patent disclosure relate to grid current control. The embodiment of FIG. 23 includes grid current control element 244 to generate direct and quadrature signals $I_D$ and $I_Q$ in response to the grid current $I_G$ and the phase signal θ from the DPLL, as well as a reference signal $I_{REF2}$. The direct and quadrature signals are applied to an inverse DQ transform element 246 which generates a phase signal φ, which is applied to sine generator 234, and a magnitude signal MAG', which is applied to Sine PWM 226. The outputs MAG and MAG" from the HDC block 230 and Sine PWM 226, respectively, are combined by an adder 248 to provide the final modulation signal Ma2.

Figure 23:
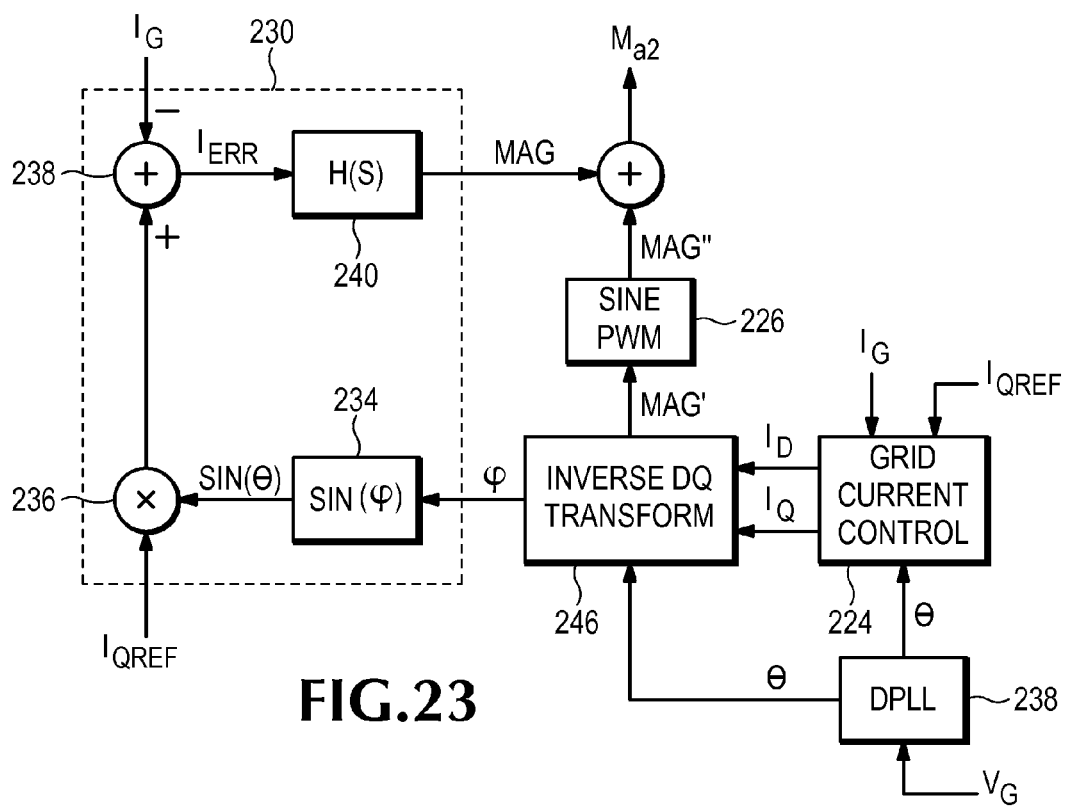
FIG. 23 illustrates an embodiment having grid current control according to some of the inventive principles of this patent disclosure.

By providing grid current control, the embodiment of FIG. 23 may be configured to force the grid voltage $V_G$ and grid current $I_G$ into a closer phase relationship. For example, the previous embodiment of FIG. 22 may provide adequate operation in systems having a purely or mostly resistive grid load. In a system having a grid load with reactive components, the grid current control feature of the embodiment of FIG. 23 may force the grid voltage and current to be in phase, thereby providing improved harmonic distortion cancellation with a reactive grid.

Although shown in conjunction with the HDC feature 230 in FIG. 23, the grid current control techniques disclosed herein may be implemented separately from this or any other HDC features according to some of the inventive principles of this patent disclosure.

The grid current control techniques illustrated in the context of FIG. 23 may also be combined with various forms of link voltage control. For example, either or both of the reference signals $I_{REF1}$ and $I_{REF2}$ may be provided by one or more link voltage control elements such as element 242 shown in FIG. 22.

Figure 24:
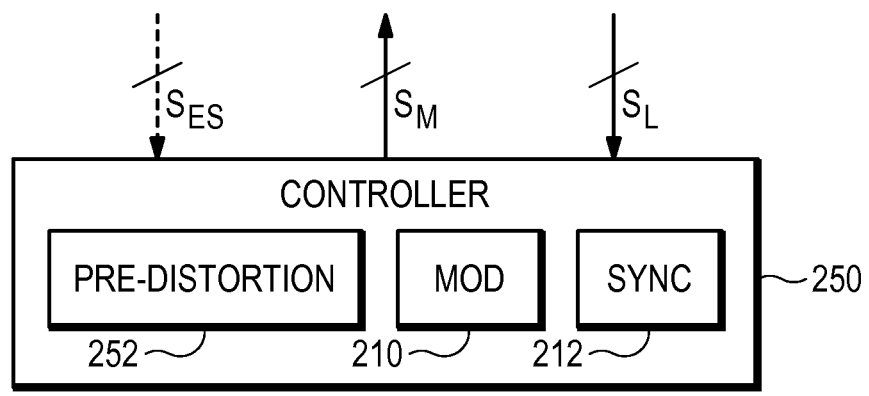
FIG. 24 illustrates an embodiment of a controller according to some of the inventive principles of this patent disclosure.

Some additional principles of this patent disclosure relate to the use of predistortion techniques for distortion mitigation. FIG. 24 illustrates an embodiment of a controller 250 having a control function such as a modulator 210 to generate one or more control signals $S_M$ to control a power stage, and a synchronization function 212 to synchronize the output of the power stage with a load in response to one or more load signals $S_L$. A predistortion element 252 provides some form of predistortion in response to any suitable signal such as a sense signal $S_{ES}$ from an energy storage element. The predistortion may be applied to the one or more control signals $S_M$ or any other signal or element to provide distortion mitigation. The controller functions may be implemented in hardware, software, firmware, etc., or any combination thereof. Hardware may be realized with analog circuitry, digital circuitry, or any combination thereof. The implementations of the functions may be consolidated in a single apparatus or distributed throughout multiple apparatus, etc.

Figure 25:
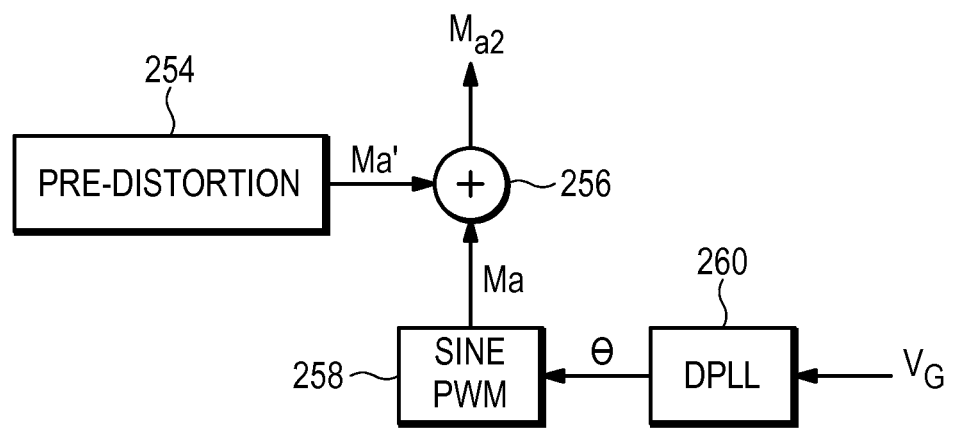
FIG. 25 illustrates an embodiment of a controller having predistortion according to some of the inventive principles of this patent disclosure.

FIG. 25 illustrates an embodiment of a controller having predistortion according to some of the inventive principles of this patent disclosure. A modulation signal Ma may be provided by any suitable source, for example any of the Ma2 signals in the embodiments disclosed above. In this example, the modulation signal Ma is provided by a simple Sine PWM element 258 which is controlled by a DPLL 260 in response to the grid voltage $V_G$. A predistortion element 254 generates a predistortion signal Ma', which is combined with the modulation signal Ma by adder 256 to generate the final modulation signal Ma". The final modulation signal Ma" may be applied to any suitable power stage. In this example, the power stage may be an H-bridge as illustrated in FIG. 21.

Predistortion methods according to some of the inventive principles of this patent disclosure may be implemented separately from, or in addition to, the other types of distortion mitigation principles disclosed herein. The predistortion element 254 may implement any type of predistortion to mitigate or cancel distortion in the power flow from a power stage to a load. For example, if applied to the system of FIG. 21, the predistortion element 254 may generate predistortion signal Ma' that anticipates, and compensates for, the distortion caused by ripple on the link voltage $V_{DC}$.

FIG. 26 illustrates an embodiment of a predistortion element according to some of the inventive principles of this patent disclosure. The embodiment of FIG. 26 includes a look-up table 262 to provide the predistortion signal Ma' in response to the instantaneous link voltage $V_{DC}$ and an average value of the link voltage $V_{DC(AVERAGE)}$.

FIG. 27 illustrates another embodiment of a predistortion element according to some of the inventive principles of this patent disclosure. The embodiment of FIG. 27 generates the predistortion signal Ma' by dividing the average value of the link voltage $V_{DC(AVERAGE)}$ by the instantaneous value $V_{DC}$. The result may be used directly as the predistortion signal or subjected to additional processing. For example, the result may be multiplied by the modulation signal Ma after transformation by a function f(s) as shown in FIG. 27.

FIG. 28 illustrates another embodiment of a predistortion element according to some of the inventive principles of this patent disclosure. The embodiment of FIG. 28 includes a look-up table 264 to provide the predistortion signal Ma' in response to the instantaneous link voltage $V_{DC}$, an average value of the link voltage $V_{DC(AVERAGE)}$, the instantaneous grid voltage $V_G$, and the RMS value of the grid voltage $V_{G(RMS)}$.

FIG. 29 illustrates another embodiment of a predistortion element according to some of the inventive principles of this patent disclosure. The embodiment of FIG. 29 calculates the predistortion signal Ma' in response to the instantaneous link voltage $V_{DC}$, an average value of the link voltage $V_{DC(AVERAGE)}$, the instantaneous grid voltage $V_G$, and the RMS value of the grid voltage $V_{G(RMS)}$ according to any suitable transfer function H(s).

In some applications, the embodiments illustrated with respect to FIGS. 26 and 27 may provide adequate distortion mitigation where the grid load has purely or nearly sinusoidal waveforms. In other applications, the embodiments illustrated with respect to FIGS. 28 and 29 may provide better distortion mitigation where the grid load waveforms contain significant amounts of distortion.

The inventive principles relating to predistortion are not limited to systems having sinusoidal AC loads. A predistortion signal Ma' may be generated to compensate for distortion in loads having waveforms such as triangle waves, sawtooth waves, square waves, etc. In embodiments having look-up tables, the look-up tables may be static, or they may change over time, for example, in response to various inputs such as line voltage, frequency, link voltage, or any other operating parameter. Distortion mitigation techniques according to the inventive principles may also be implemented using any suitable algorithms including some from the audio industry which may be applied directly or adapted for use with the inventive principles.

The various inventive principles relating to distortion mitigation may all be utilized separately, or in combination with other inventive principles. For example, in some embodiments, a controller may combine predistortion with link voltage control, while in other embodiments, a controller may combine direct harmonic distortion cancellation with grid current control, predistortion and link voltage control according to some of the inventive principles of this patent disclosure.

Impedance Transformation

Some additional inventive principles of this patent disclosure relate to techniques for manipulating a constant power control loop to provide impedance transformation, to determine a maximum power point or other operating point, and/or for other purposes.

Figure 30:
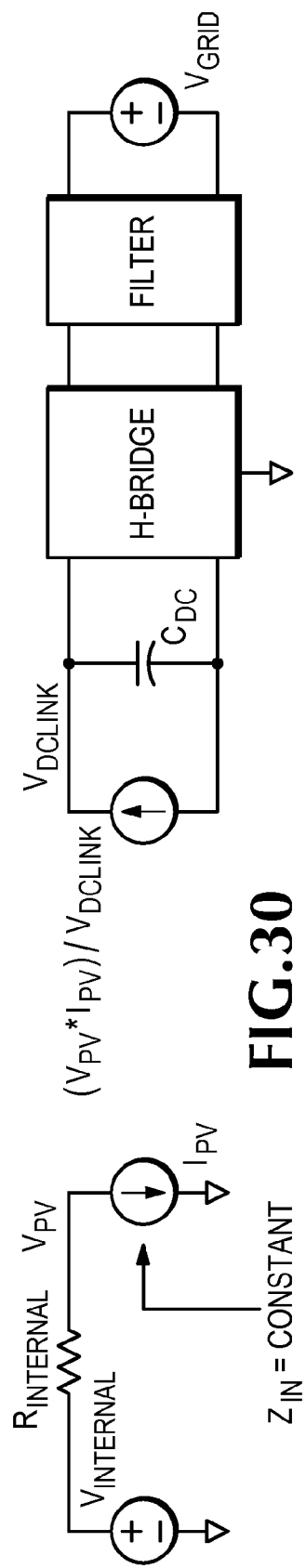
FIG. 30 illustrates an embodiment of impedance transformation according to some of the inventive principles of this patent disclosure.

Referring to FIG. 30, a PV panel is modeled as a voltage source $V_{INTERNAL}$ and a series resistance $R_{INTERNAL}$. A constant power control loop causes the PV panel to see a constant load $I_{PV}$ with a constant input impedance of $Z_{IN}=V_{PV}/I_{PV}$. Due to the impedance transformation, the constant power applied to load $I_{PV}$ is transformed to a constant power delivered to the DC link. The power P is constant and equal to $V_{PV}*I_{PV}$. Since the power is constant, and the current drawn by the H-bridge varies at twice the line frequency, the link voltage $V_{DCLINK}$ must also vary at twice the line frequency because the product of the current and voltage must be constant. Thus, the current delivered to the DC link varies as $P/V_{DCLINK}=V_{PV}*I_{PV}/V_{DCLINK}$.

Power transfer from the PV panel to the converter system is maximized when the series resistance of the panel $R_{INTERNAL}$ matches the impedance presented by the load $I_{PV}$, that is, when $Z_{IN}=R_{INTERNAL}=V_{PV}/I_{PV}$.

Figure 31:
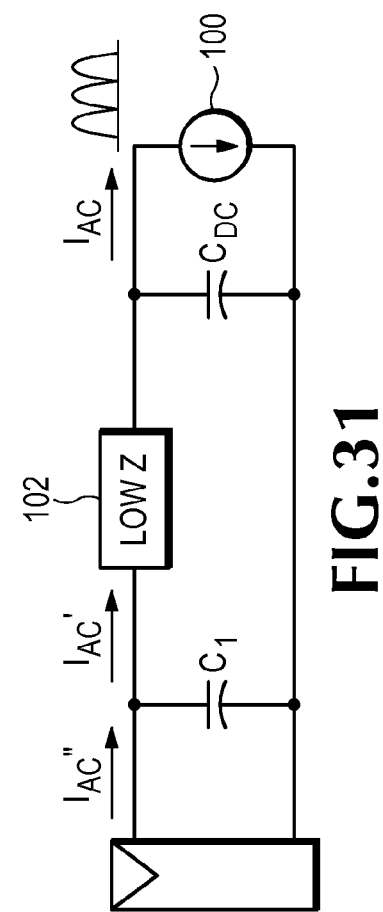
FIG. 31 illustrates the operation of a power conversion system without impedance transformation.

In some embodiments, a system that implements constant power control as described above may transform a DC/DC converter or other power stage from a low AC impedance path to a high AC impedance path. This can be better understood with reference to FIG. 31 where an AC load is illustrated as a current source 100 which draws a pulsating current $I_{AC}$. A conventional DC/DC converter is illustrated as a low impedance path 102. If either of capacitors $C_1$ or $C_{DC}$ has a large value, it forms a low impedance path to the common node, and therefore, the pulsating current $I_{AC}$ is blocked from being reflected back to the PV panel. If, however, capacitors $C_1$ and $C_{DC}$ are removed or reduced in size, the DC/DC converter forms a low impedance AC path between the load 100 and the PV panel. Thus, the pulsations in the current $I_{AC}$ show up as voltage and/or current fluctuations at the output of the PV panel.

Implementing a constant power control loop in the DC/DC converter, however, may cause the converter to appear as a path having a high AC impedance. Therefore, the pulsating AC current $I_{AC}$ is prevented from flowing through the DC/DC converter. As a result, all or most of the AC current must flow through the link capacitor $C_{DC}$, which, because of its low capacitance, causes a large voltage swing across $C_{DC}$.

Because the impedance transformation properties of constant power control may be the result of control operations rather than hardwired components, they may be changed rapidly and/or in a controlled manner. For example, the flow-through impedance of the DC/DC converter can be changed instantaneously by the controller. Such properties may be exploited to provide some beneficial results.

Operating Point Sweep

One such application involves determining a maximum power point or other operating point for a power source coupled to a power converter according to some of the inventive principles of this patent disclosure.

Figure 32:
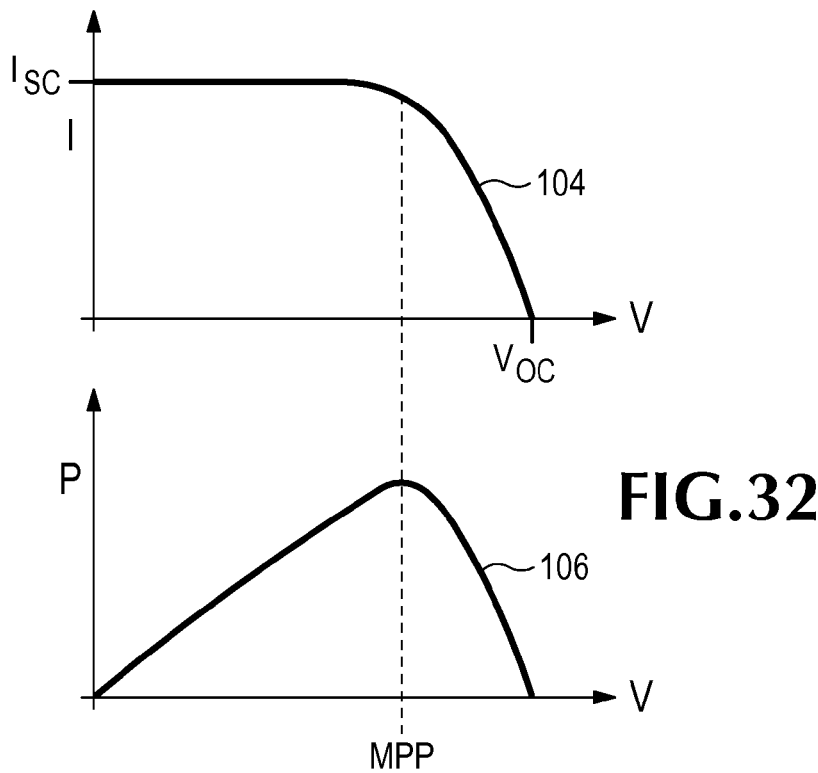
FIG. 32 illustrates the voltage-current curve and power curve of a typical PV panel.

Referring to FIG. 32, curve 104 illustrates the voltage-current characteristic (V-I curve) of a typical PV panel under certain operating conditions, while curve 106 illustrates the corresponding power characteristic (power curve) for the same panel under the same conditions. The V-I curve is zero volts with a value of $I_{SC}$ which is the short-circuit current generated by the panel when the output terminals are shorted together. As the output voltage increases, the V-I curve remains at a fairly constant level of current until it reaches a knee at which it descends rapidly toward zero current at $V_{OC}$, which is the open-circuit output voltage of the panel.

The power curve is simply the current times the voltage at each point along the V-I curve. The power curve has a maximum value corresponding to a certain voltage level and a certain current level. This is known as the maximum power point or MPP. Most PV power systems attempt to operate at the maximum power point. The maximum power point, however, tends to change based on changes in operating conditions such as illumination level, temperature, age of the panel, etc. Therefore, algorithms have been devised for tracking the MPP as it changes over time.

Figure 33:
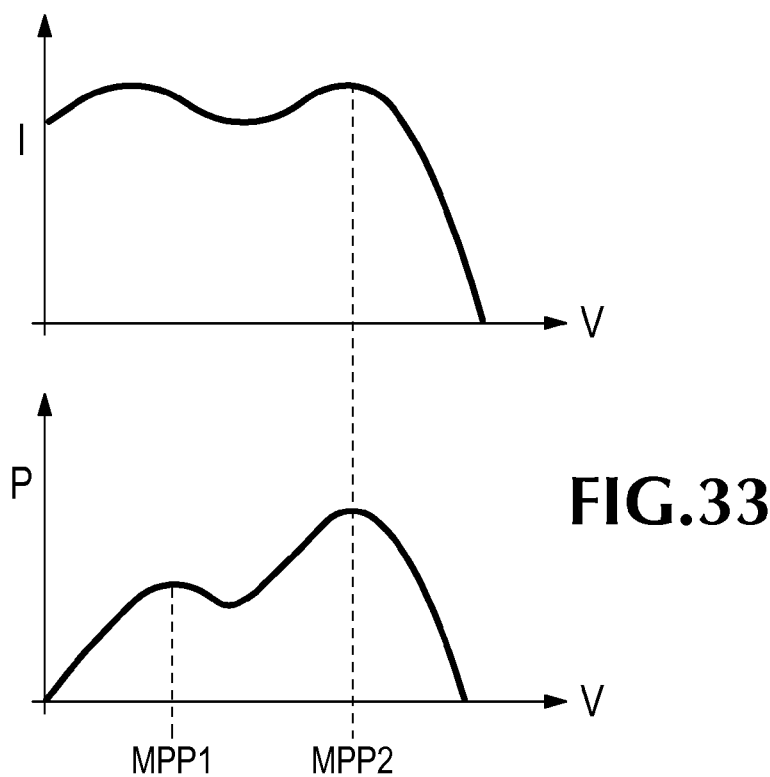
FIG. 33 illustrates V-I and power curves for a power source having more than one local maximum power point.

Existing algorithms for maximum power point tracking (MPPT) are generally slow processes that are performed over a relatively long time frame compared to the period of an AC line cycle. Moreover, existing algorithms assume that only one MPP exists in the power curve. Power curves for some PV panels and other power sources, however, may have multiple local maximum points. One example is shown in FIG. 33 which illustrates V-I and power curves for a power source having more than one local MPP. A conventional MPPT algorithm might approach local maximum MPP1 from the left and stop once it determines that the power curve is trending back down as it moves to the right. In this case, the algorithm would erroneously determine that MMP1 is the maximum power point rather than MMP2, which is the true maximum power point. An existing algorithm may be modified by forcing it to continue searching through the rest of the voltage range, but with existing techniques, this would be a lengthy process.

In a power conversion system having constant power control, the control technique may be manipulated to provide maximum power point tracking or other techniques according to some additional inventive principles of this patent disclosure. As explained above, a constant power control loop may prevent power pulses from being reflected back to a power source. This is illustrated in FIG. 34 where a power stage 108 is controlled by a constant power control loop 110 which prevents power pulses from AC load 112 from reaching the power source 114.

By selectively disabling or otherwise modifying the constant power control loop, some or all of the power pulsations may be reflected back to the power source in a manner that can be observed for purposes of determining an operating point or other useful information. For example, in FIG. 35, the control loop 110 is disabled by SW1. This causes the power stage to operate in some other mode, for example, at a fixed duty cycle, thereby allowing power pulsations from the AC load to reach the power source. A tracking circuit 116 measures the resulting voltage and/or current fluctuations in the output from the power source 114 and uses this information to implement an MMPT algorithm or other processes. The use of a relatively small energy storage devices such as a small capacitor may enable the power pulsations from the AC load to reach the power source. If, for example, a larger capacitor is used, it may block the pulses from reaching the source.

Figure 34:
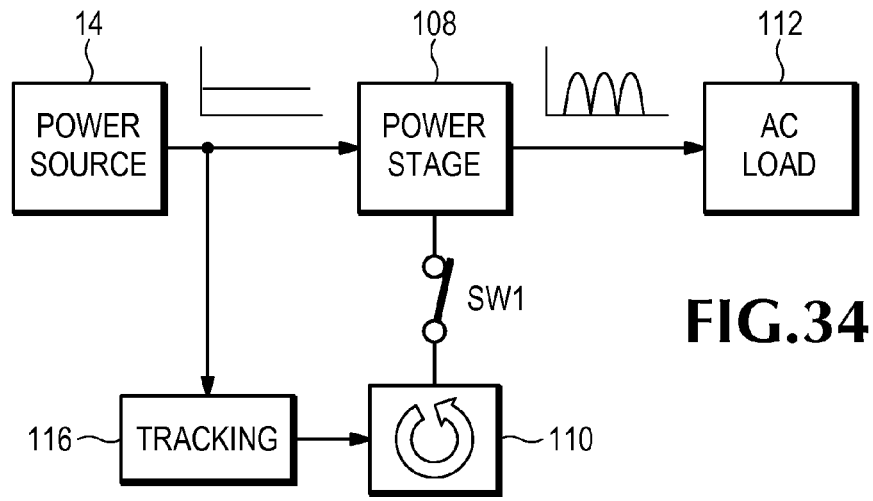
FIG. 34 illustrates an embodiment of a power conversion system having constant power control and an input sweeping feature according to some of the inventive principles of this patent disclosure.
Figure 35:
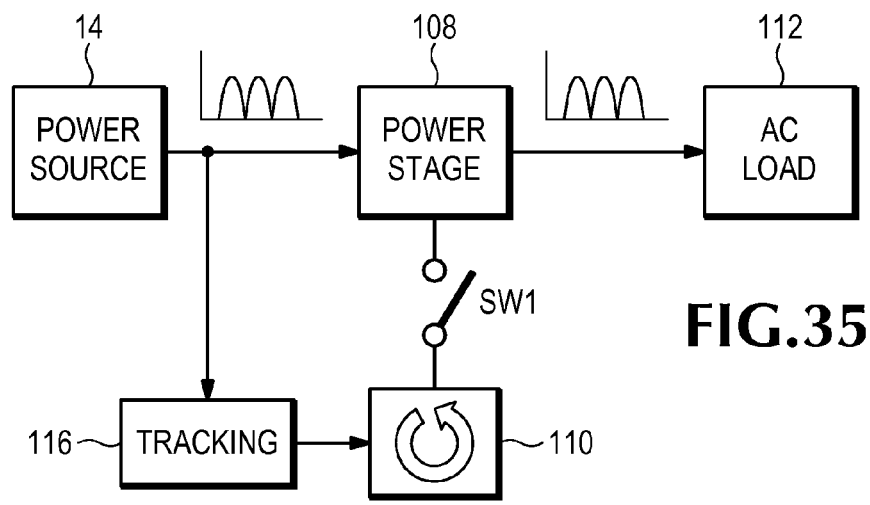
FIG. 35 illustrates the embodiment of FIG. 20 with the constant power control disabled according to some of the inventive principles of this patent disclosure.
Figure 36:
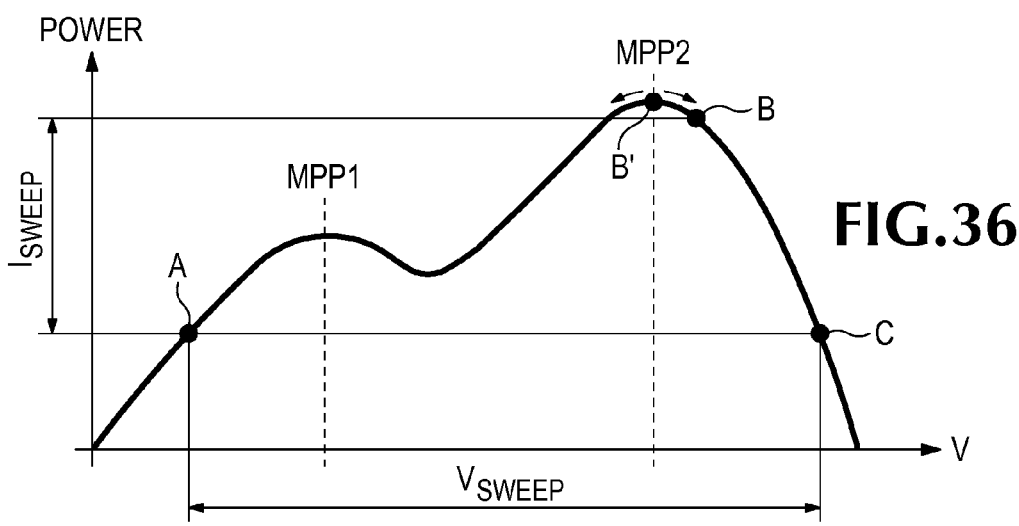
FIG. 36 illustrates how the embodiment of FIGS. 20 and 21 may operate under some conditions.

FIG. 36 illustrates how the embodiment of FIGS. 34 and 35 may operate under some conditions. The system is initially assumed to be operating at point B with the constant power control loop enabled. The control loop is then disabled to allow the power stage 108 to operate open loop at a fixed duty cycle. The power pulsations from the AC load are reflected back to the power source, thereby causing the operating point to ride back and forth along the power curve between points A and C as the output voltage and current from the power source sweep through the corresponding ranges $V_{SWEEP}$ and $I_{SWEEP}$. The tracking circuit 116 monitors the output voltage and current and can therefore calculate the power at every point between A and C. Since the swept range includes both local maximums MPP1 and MPP2, the tracking circuit can compare them to determine the true MPP.

In this example, the true MPP is found to be at point B'. Once the MPP is determined, the constant power loop may be re-enabled to cause the system to remain at B' regardless of fluctuations in the AC load. In the absence of the constant power control loop, fluctuations in the AC load would cause the operating point to fluctuate around point B' as shown by the arrows in FIG. 36.

The tracking operation described above may provide a fast and robust technique for determining the MPP or other operating point because it may sweep a large operating range on a smaller time scale than is typically employed in MPPT routines, in some cases in less than a line cycle of the AC load. For example, in a system with a sinusoidal output, the information in the first phase is the same as the second phase. Therefore, in a system with a 60 Hz sinusoidal output only a half cycle of the 120 Hz power ripple is needed to obtain all of the information. Thus, the sweep can be conducted in ¼ of a 60 Hz line cycle or ~4 ms.

Implementation may be fast and simple because the constant power control loop may be easily enabled, disabled or otherwise modified in a control algorithm. During the sweeping process, perturbations are provided by the AC load, thereby reducing or eliminating the need for additional circuitry to create perturbations.

The process may also be highly flexible and adaptable to countless variations in numerous parameters. For example, the power stage may be set to any suitable fixed duty cycle or other operating mode during the sweeping operation. Alternatively, the duty cycle may be stepped through different values to extend the sweep range over the course of multiple cycles of the AC load. The system may be configured to sweep the entire operating range of the power source, or fixed or flexible bounds may be placed on the sweep range. For example, in some embodiments, a sweep operation may simply be allowed to sweep whatever range is provided by the particular AC load using a particular fixed duty cycle in the power stage. In other embodiments, limits may be set in the output voltage and/or current from the power source. For example, if a high or low limit is reached, the constant power control loop may be enabled, either at the original operating point (B), or at some revised operating point, e.g., the limit itself. Thus, the control loop itself may be used to limit the swing through the V-I and power curves if the entire dynamic range does not need to be sampled.

A sweep operation may be initiated in response to various events according to some of the inventive principles. In some embodiments, sweep operations may be initiated at periodic time intervals, e.g., once every second or few seconds, once every minute or few minutes, etc. In other embodiments, a sweep operation may be triggered when a monitoring operation determines that the system is not operating where it would normally be expected to operate. A sweep operation may alternatively be initiated by an external stimulus.

In the example embodiment of FIGS. 34 and 35, the AC load itself is used to create fluctuations at the power source, but other apparatus may also be employed to create calibrated fluctuations. For example, a controllable load may be substituted for the normal AC load to provide fluctuations at a controlled rate, and within controlled bounds. Alternatively, the controllable load may provide one or more discrete load points rather than sweeping through every point within a range. A controllable load may be controlled independently, or by the same control circuitry used for the tracking operations.

Any or all of these features may be implemented in a dedicated controller or logic, or in a controller or logic that may implement other features of the power conversion system.

Multiple Power Sources with Individual Power Control

Figure 37:
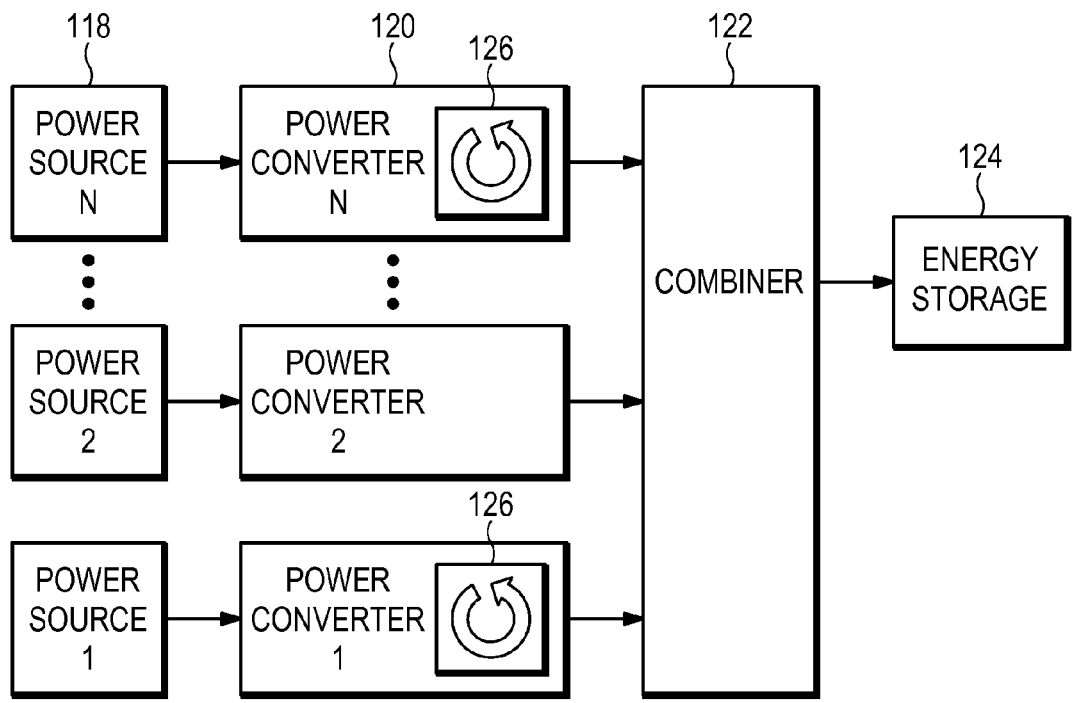
FIG. 37 illustrates an embodiment of a system with multiple power sources according to some of the inventive principles of this patent disclosure.

Some additional inventive principles of this patent disclosure relate to the use of power control in systems having multiple power sources. FIG. 37 illustrates an embodiment of a system in which N multiple power sources 118 are each coupled to a corresponding one of N power converters 120. The outputs of the power converters are combined by combiner 122 and applied to at least one energy storage device 124. The outputs of the power converters may be combined in series, parallel, series-parallel combination, or any other suitable arrangement. The power sources include photovoltaic devices, fuel cells, batteries, wind turbines, or any other power sources or combinations thereof. The power converters may include one or more stages of DC/DC converters, DC/AC inverters, rectifiers, etc., or any combination thereof. One or more of the power converters include constant power control functionality 126.

Figure 38:
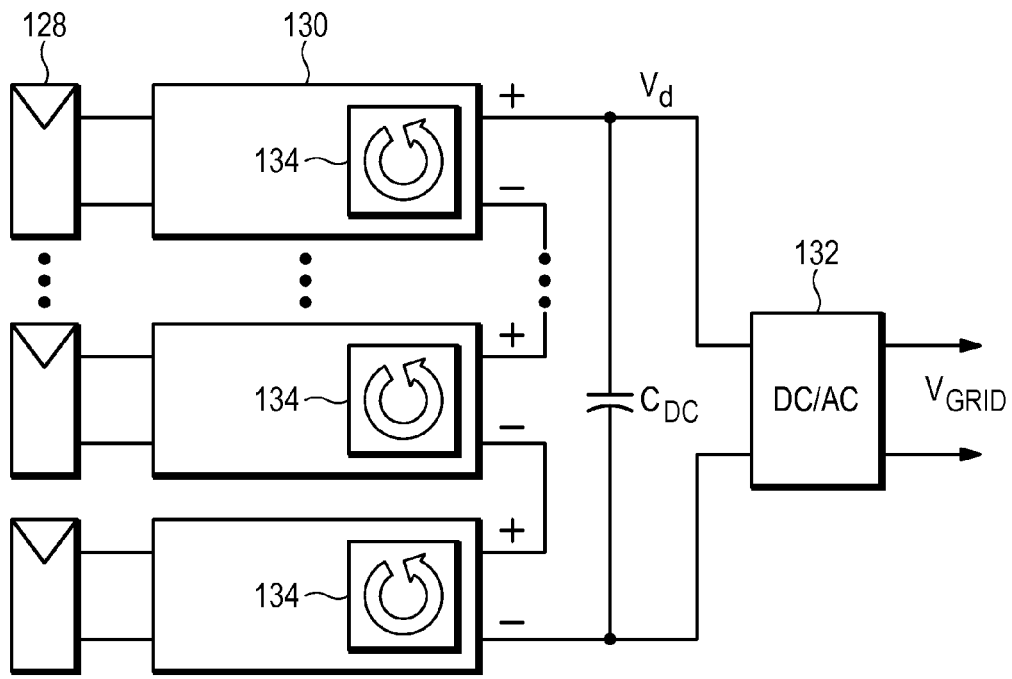
FIG. 38 illustrates an embodiment of a power conversion system in which multiple DC/DC converters include constant power control functionality according to some of the inventive principles of this patent disclosure.

FIG. 38 illustrates an embodiment of a power conversion system in which multiple DC/DC converters include constant power control functionality according to some of the inventive principles of this patent disclosure. In the embodiment of FIG. 38, the power sources are implemented as PV panels 128, each of which provides power to a corresponding DC/DC converter 130. The outputs of the DC/DC converters are arranged in series to generate a DC link voltage $V_d$ which is applied to a link capacitor $C_{DC}$. A DC/AC inverter 132 converts the link voltage to an AC voltage $V_{GRID}$.

Each of the DC/DC converters 130 implements a constant power control loop 134 to maintain constant power transfer from its associated PV panel. Each of the DC/DC converters 130 may also implement a maximum power point tracking function (MPPT) which operates as a slower outer control loop around the relatively faster inner constant power control loop. Each DC/DC converter outputs a constant power that corresponds to the input power provided by each of the individual power sources. The link capacitor $C_{DC}$ operates as a combined energy storage element for all of the DC/DC converters. The link voltage Vd includes an AC ripple component on top of a DC component, where the amount of AC ripple depends on the size of the link capacitor as discussed below. The output voltage and current from each DC/DC converter is allowed to float so they can settle in to values that balance the voltage and current constraints of the entire power system. Because the converters 130 are arranged in series in this example, the output current through each DC/DC converter must be equal, while the sum of the output voltages must equal the DC link voltage $V_d$. Other embodiments may be arranged for different constraints. For example, in an embodiment where the DC/DC converters are connected in parallel, each converter may provide a different amount of current.

The system of FIG. 38 may also include a link voltage control function that modulates the demand from the DC/AC inverter to maintain the average or RMS value of the link voltage at a level that provides optimum operation of the DC/AC inverter and/or prevents or reduces harmonic distortion at the output.

Because each of the DC/DC converters 130 implements an individual constant power control loop, the input ripple at each converter may be optimally minimized for each PV panel. By adding MPPT functionality to each converter, the power output from each PV panel may also be optimized regardless of differences in the operating conditions for each panel, e.g., illumination conditions, temperature, age, etc.

Moreover, the size of the link capacitor $C_{DC}$ may be reduced depending on the implementation details. For example, in an embodiment having a DC/AC inverter 132 with a harmonic distortion mitigation feature, it may be possible to reduce the size of the link capacitor. Even though the use of a smaller capacitor results in larger voltage fluctuations on the link capacitor, the presence of a harmonic distortion mitigation feature may reduce distortion in the AC output to an acceptable level. In an embodiment with a conventional DC/AC inverter without harmonic distortion mitigation, however, it may still be necessary to use a relatively large link capacitor because a large ripple voltage on the link capacitor may cause unacceptable levels of distortion in the AC output.

Some additional inventive principles of this patent disclosure relate to power conversion system architectures that may be realized using some or all of the other inventive principles disclosed herein, alone or in various combinations. Some of these architectures will be described with reference to the following drawings.

Figure 39:
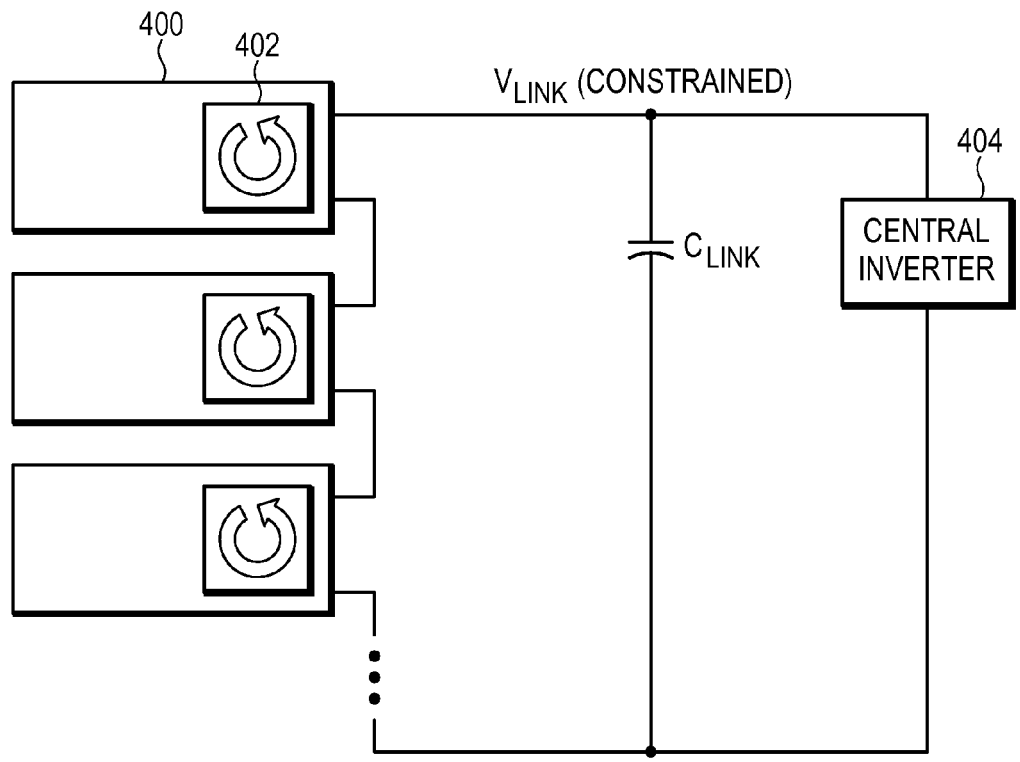
FIGS. 39-42 illustrate embodiments of power conversion system having multiple converters with power control and a central inverter according to some of the inventive principles of this patent disclosure.

FIG. 39 illustrates an embodiment in which multiple modules 400, some or all of which include constant power control 402, are arranged in series to generate a DC link $V_{LINK}$ that is applied to a conventional central inverter 404. Because a conventional central inverter 404 is used, a relatively large link capacitor $C_{LINK}$ is utilized to limit the AC ripple and provide a constrained DC link that prevents excessive distortion in the AC output.

Figure 40:
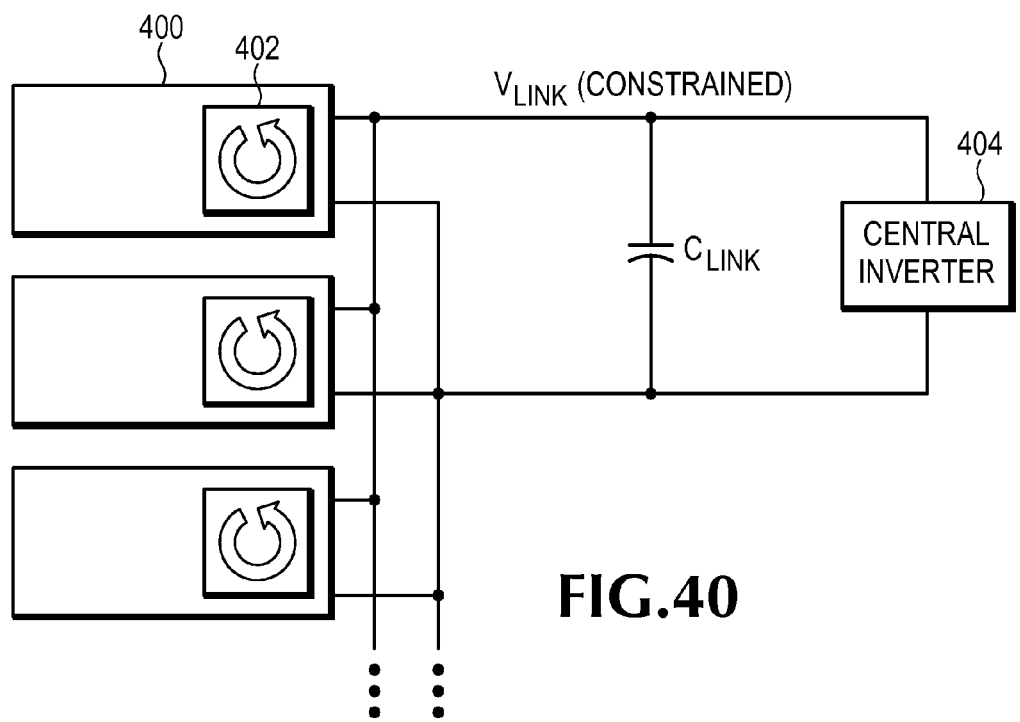

FIG. 40 illustrates an embodiment in which multiple modules 400, some or all of which include constant power control 402, are arranged in parallel.

Figure 41:
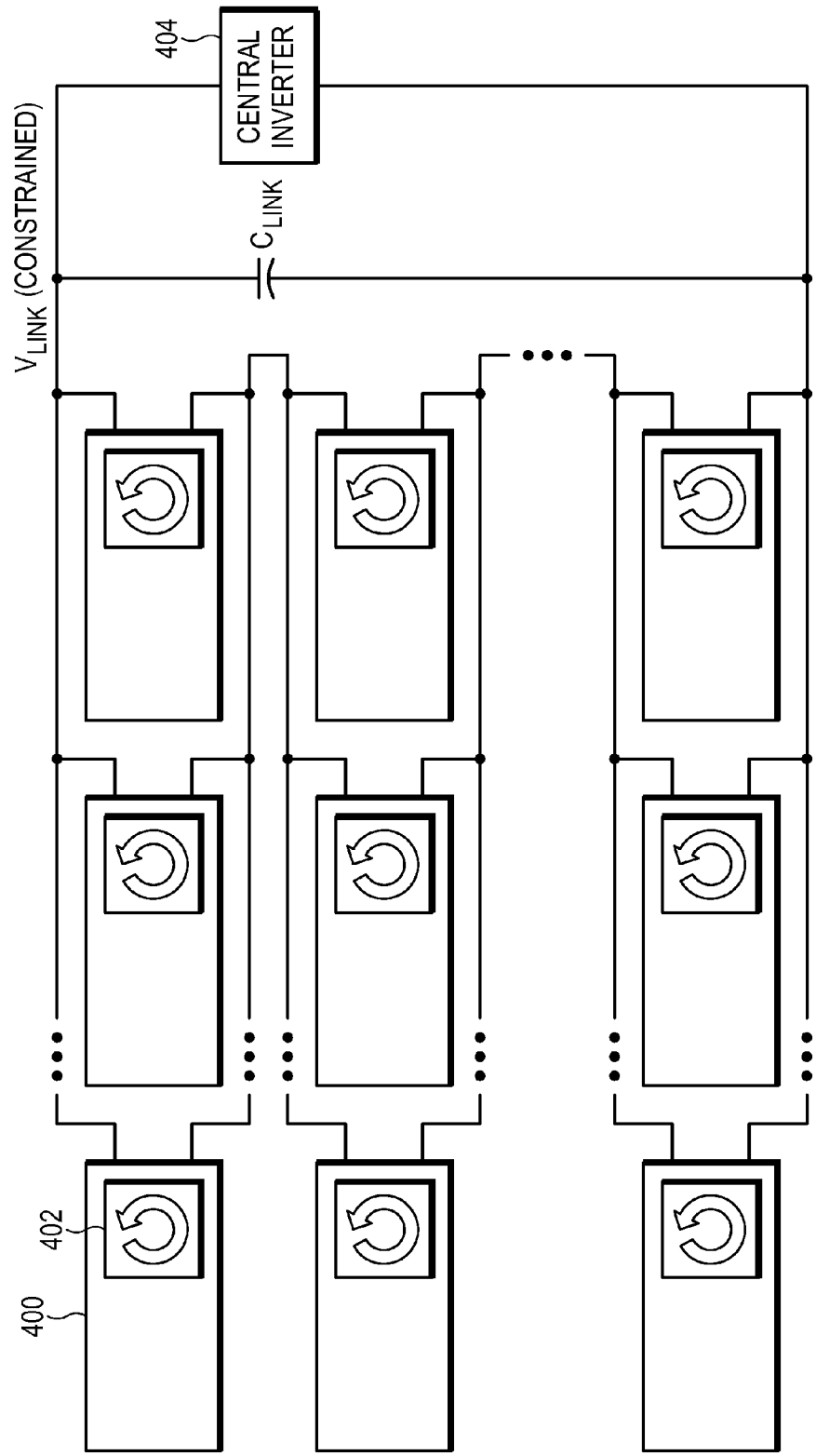

FIG. 41 illustrates a parallel-series embodiment in which multiple modules 400 are arranged first in parallel units. The parallel units are then arranged in series to provide the DC link $V_{LINK}$.

Figure 42:
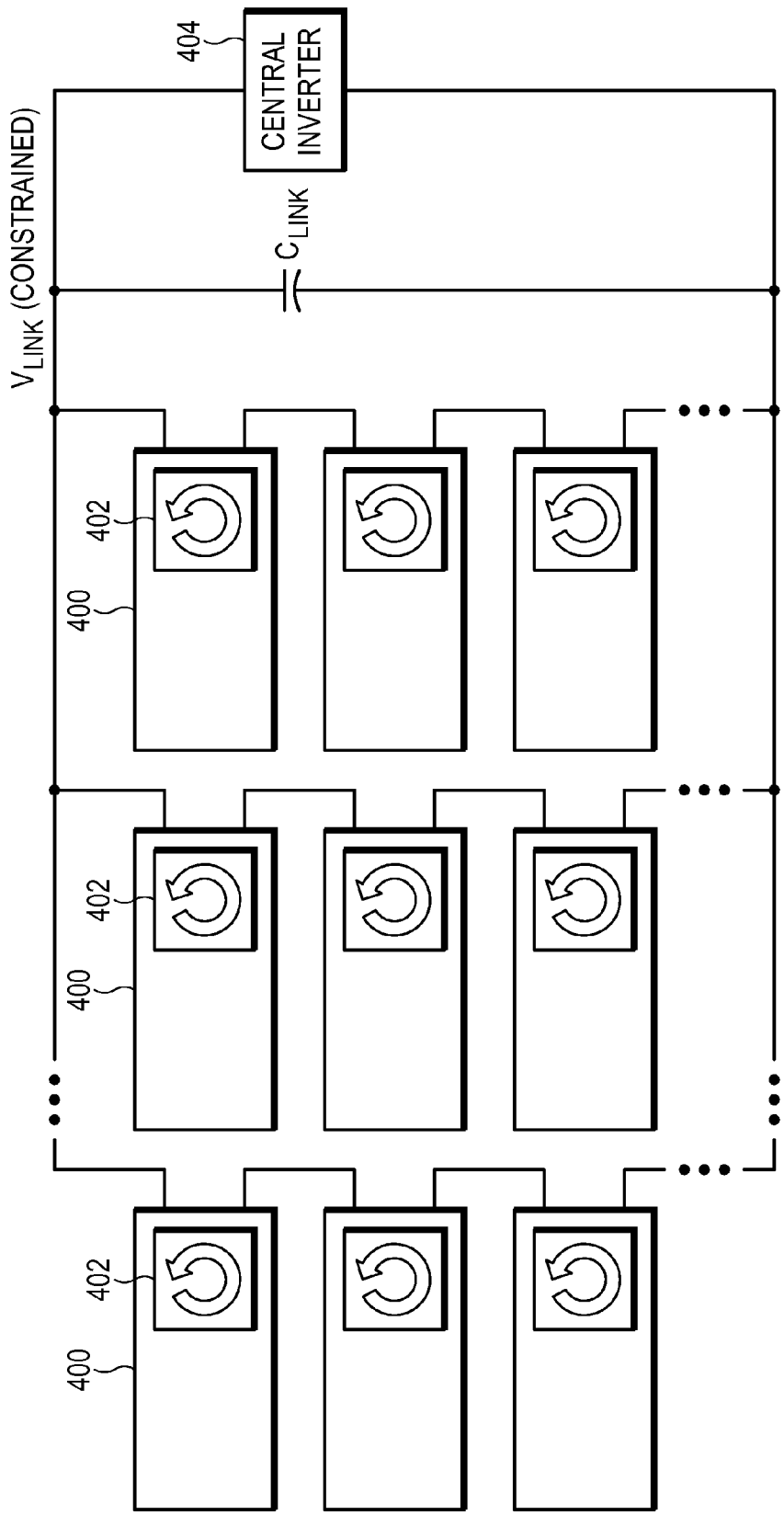

FIG. 42 illustrates a series-parallel embodiment in which multiple modules 400 are arranged first in serial units or strings. The individual strings are then arranged in a parallel combination to generate the DC link $V_{LINK}$.

In each of the embodiments of FIGS. 39-42, the modules may be implemented with various alternative structures, for example, in some embodiments, each module 400 may be one or more solar panels, fuel cells or other power sources that have the constant power control 402 integrated in the source. In other embodiments, the modules may include one or more power sources plus an associated DC/DC converter where the constant power control 402 may be part of the DC/DC converter. Other module configuration are possible, including a combination of those disclosed herein.

Also in each of the embodiments of FIGS. 39-42, because a conventional central inverter 404 is used, a relatively large link capacitor $C_{LINK}$ is utilized to limit the AC ripple and provide a constrained DC link that prevents excessive distortion in the AC output.

Some additional inventive principles relate to the use of harmonic distortion mitigation in a central inverter or other power stage in combination with one or more power sources having constant power control.

Figure 43:
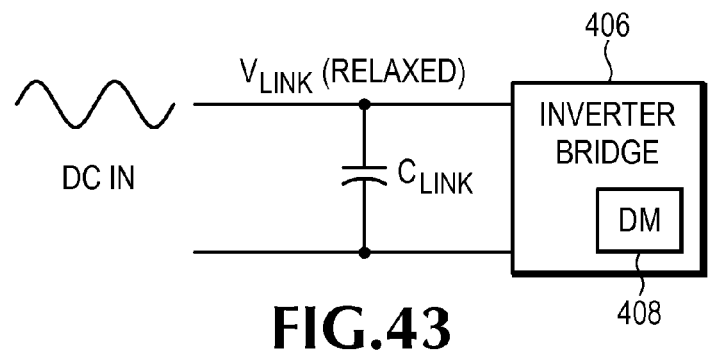
FIGS. 43-51 illustrate embodiments having distortion mitigation according to some of the inventive principles of this patent disclosure.

FIG. 43 illustrates an embodiment in which a central inverter based on an inverter bridge 406 includes harmonic distortion mitigation 408 according to the inventive principles of this disclosure. In this embodiment, the DC link $V_{LINK}$ may be generated by one or more power sources, some or all of which include constant power control. For example, any of the power source arrangements illustrated in FIGS. 39-42 may be used to generate $V_{LINK}$. However, because the H-bridge 406 includes harmonic distortion mitigation 408, the ripple constraints on $V_{LINK}$ may be relaxed, and therefore, a smaller link capacitor may be used. That is, larger voltage fluctuations may be allowed on $V_{LINK}$ without causing excessive distortion in the AC output due to the operation of harmonic distortion mitigation 408. Thus, the one or more power sources having constant power control may be allowed to generate a relaxed DC link on a smaller capacitor.

Figure 44:
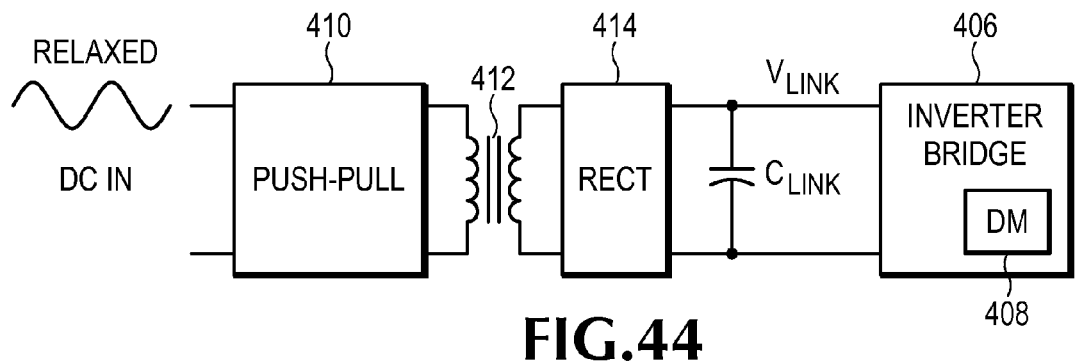
Figure 45:
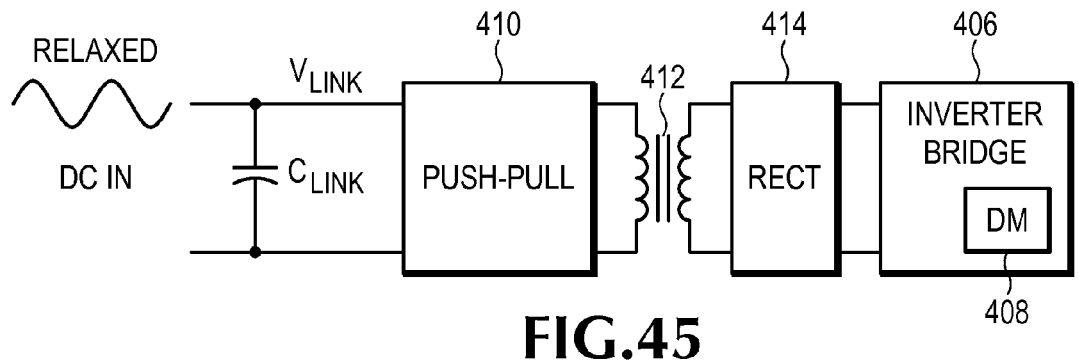

FIG. 44 illustrates another embodiment of a central inverter that may operate with a relaxed DC link. In this embodiment, the inverter includes a push-pull stage 410 followed by a transformer 412 to provide isolation, a rectifier 414, and an inverter bridge 406. The inverter bridge includes harmonic distortion mitigation 408. In this embodiment, energy storage may be provided by a relatively small DC link capacitor $C_{LINK}$ that is arranged between the rectifier and the inverter bridge. In another embodiment, the link capacitor may be arranged in front of the push-pull stage as shown in FIG. 45. In yet other embodiments, the energy storage may be distributed between multiple locations. Any of these embodiments may also include other power stages such as preregulators, etc. Likewise, MPPT may be included at any suitable point, for example, at the input to the push-pull stage or the inverter bridge.

Figure 46:
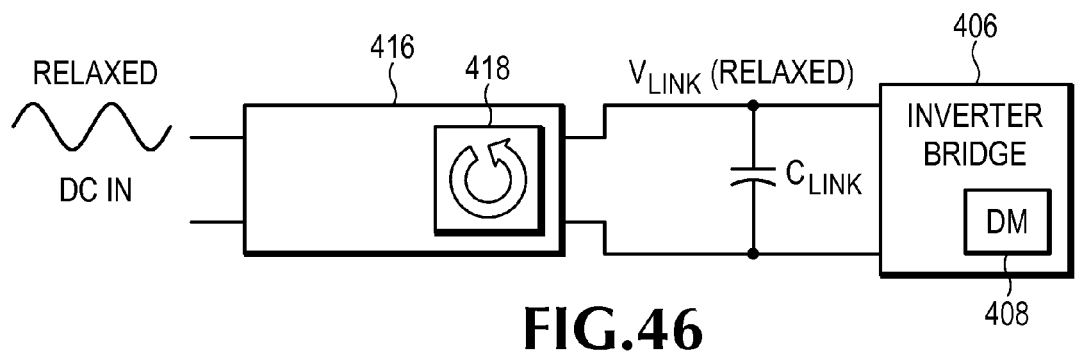

FIG. 46 illustrates another embodiment of a central inverter that may operate with a relaxed DC link. In this embodiment, the relaxed DC link input is applied to a DC/DC converter 416, which may also include constant power control 418. The output of the DC/DC converter stage is applied to an inverter bridge 406 having distortion mitigation 408. A relatively small DC link capacitor $C_{LINK}$ may be arranged between the DC/DC converter and the inverter bridge.

Figure 47:
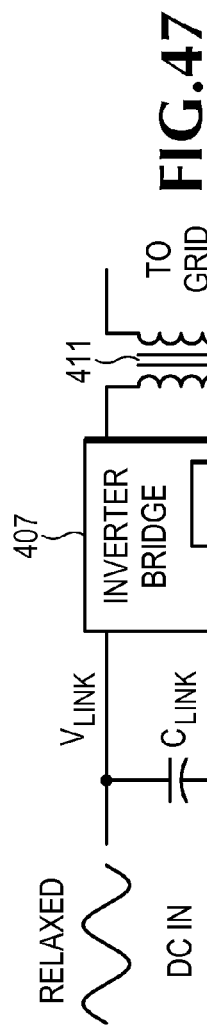

FIG. 47 illustrates another embodiment of a central inverter that may operate with a relaxed DC link. In this embodiment, the relaxed DC link input $V_{LINK}$ is applied to a line-frequency inverter bridge 407 having distortion mitigation 409. The output from the inverter bridge is applied to a line-frequency transformer 411 that couples the inverter to a power grid or other AC load.

Some additional inventive principles relate to the use of constant power control and harmonic distortion mitigation in a central inverter or other power stage or stages in combination with one or more conventional power sources.

Figure 48:
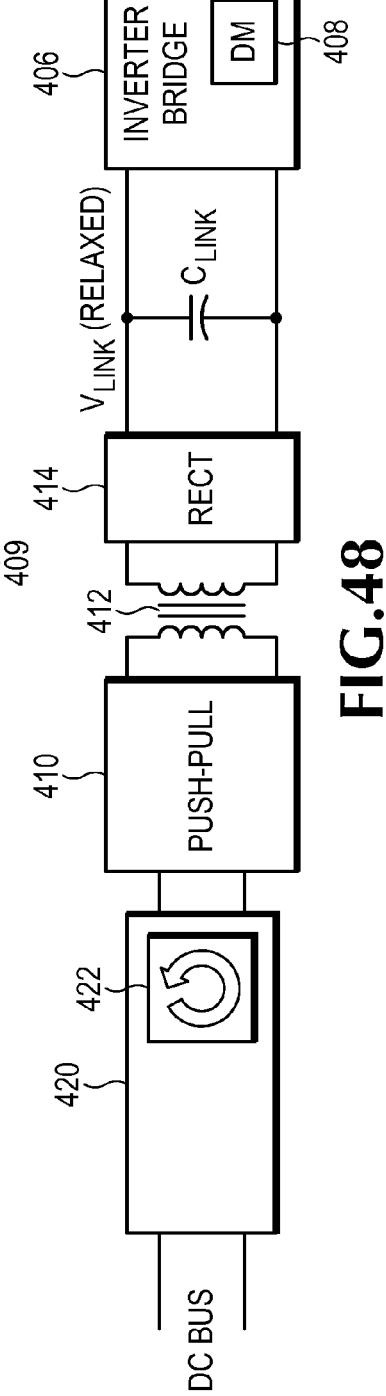

FIG. 48 illustrates an embodiment of a central inverter that may operate with an input directly from one or more power sources such as PV panels, fuel cells, etc. The one or more power sources generate a DC bus $V_{BUS}$ that is input to a DC/DC converter 420 having constant power control 422. The DC/DC converter is followed by a push-pull stage 410, a transformer 412, a rectifier 414 and an inverter bridge 406 having distortion mitigation 408.

A relatively small capacitor may be used for the link capacitor $C_{LINK}$ because the constant power loop prevents ripple on the capacitor from being reflected back to the one or more power sources, while the distortion mitigation may prevent or reduce distortion on the AC output caused by ripple on the DC link. Thus, a relaxed DC link may be used.

Figure 49:
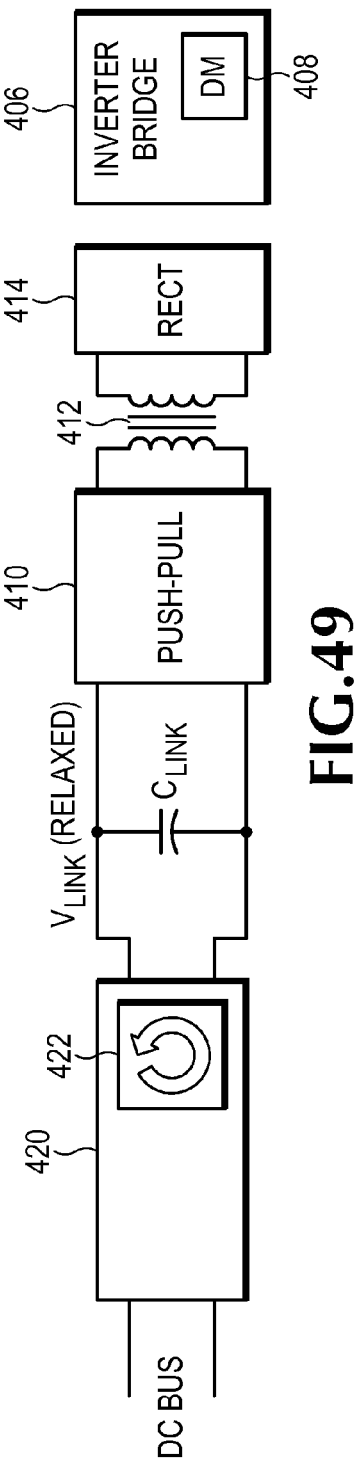

In the embodiment of FIG. 48, the link capacitor $C_{LINK}$ is arranged between the rectifier and the inverter bridge, but in other embodiments, the link capacitor may be arranged between the DC/DC converter 420 and the push-pull stage 410 as shown in FIG. 49, or any other suitable location in the inverter.

In the embodiments of FIGS. 48 and 49, an MPPT function may also be implemented in the DC/DC converter, at the inverter bridge, or elsewhere in the inverter to set an operating point for the constant power control, thereby maximizing the power transfer from the power source or sources on the DC bus.

The inventive principles described with respect to the embodiments of FIGS. 44-49 may be applied to systems with central inverters, distributed inverters, combinations thereof, etc.

Some additional inventive principles relate to the use of distortion mitigation with distributed inverters, also referred to as microinverters or nanoinverters.

Figure 50:
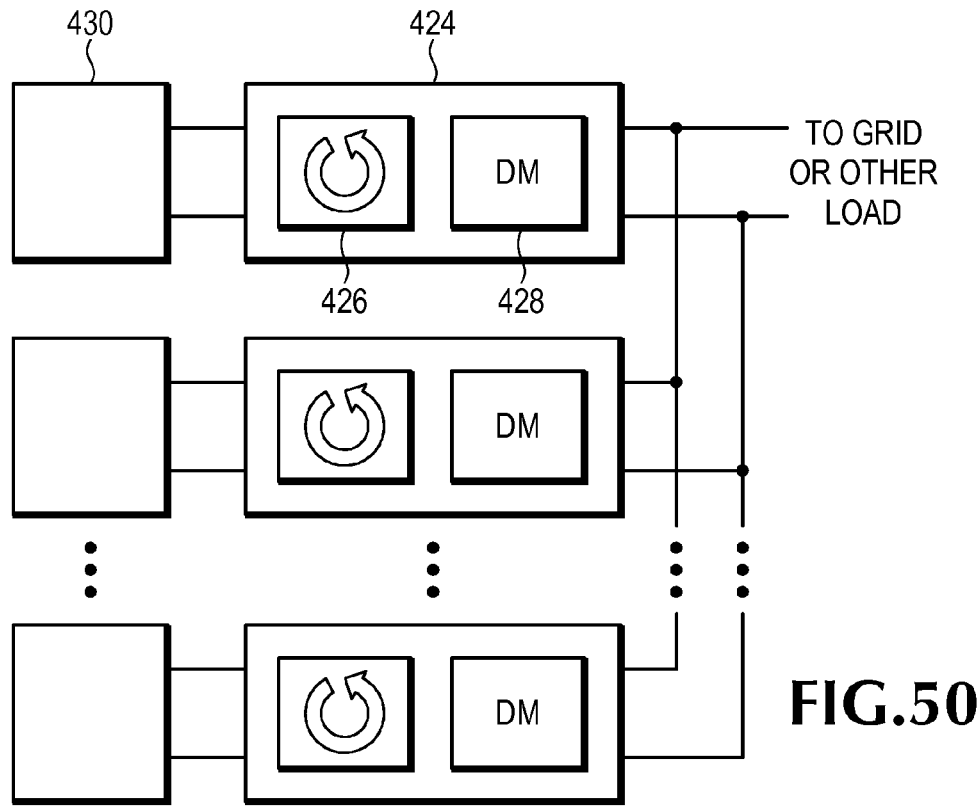

FIG. 50 illustrates an embodiment of a system in which multiple distributed inverters 424 receive power directly from multiple power sources 430. Some or all of the inverters include constant power control 426 and distortion mitigation 428. The outputs from the distributed inverters are combined to provide an AC output to a grid or other AC load.

Figure 51:
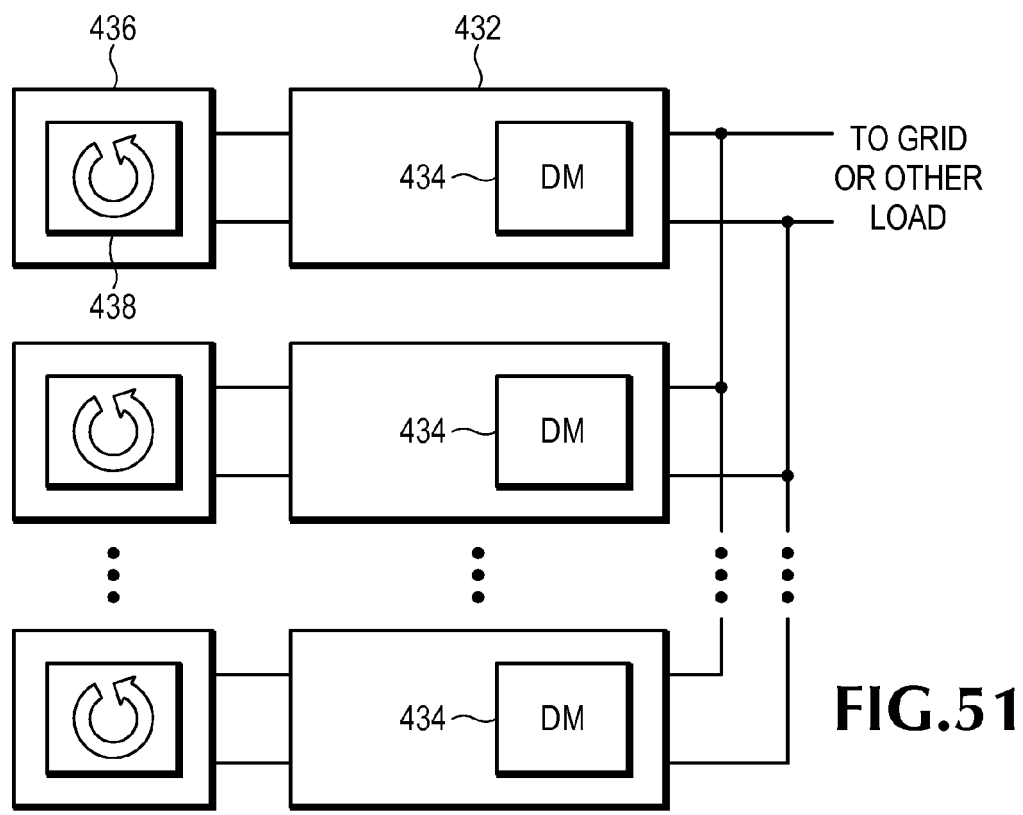

FIG. 51 illustrates an embodiment of a system in which multiple distributed inverters 432 receive power from multiple power sources 436. Some or all of the power sources include constant power control 438 to provide a relaxed DC link to the inverters, and some or all of the inverters include distortion mitigation 434 to prevent ripple on a relaxed DC link from causing unacceptable distortion in the AC output. The outputs from the distributed inverters are combined to provide an AC output to a grid or other AC load.

In the embodiments of FIGS. 50 and 51, an MPPT function may also be implemented in the distributed inverters or at any of the power sources to set an operating point for the constant power control, thereby maximizing the power transfer from the power source or sources.

Applications

Although some of the inventive principles of this patent disclosure have been described in the context of some specific embodiments relating to DC-to-AC inverter systems, the inventive principles have broad applicability to a wide range of power conversion systems where systems see dynamic loads and/or dynamic power sources, and therefore, require energy storage devices to balance the flow of power from source to load. The inventive principles may be especially advantageous where reliability is important and energy storage devices have conventionally been unreliable. Some examples of suitable applications include: electric and hybrid cars, fork lifts, people movers, tramways, metro-systems; air cooling systems; solar- and wind-energy systems including inverter/converter boxes; energy storage (battery) decoupling; power supplies of all kinds; motors drives of all kinds; energy conversion systems such as battery chargers and charge controllers; induction heating; EMI reduction filters including high-voltage applications; etc.

Moreover, some of the inventive principles relating to constant power control have been described in the context of embodiments having relatively steady power sources and fluctuating loads, but constant power control may also be applied to systems having fluctuating power sources and relatively steady loads. They may also be applied to systems having both fluctuating power sources and fluctuating loads with a relatively steady power link between the source and load. In general, constant power control may be applied to isolate one or more portions of a having relatively steady power from one or more portions having fluctuating power.

For example, the inventive principles relating to constant power control may be applied to energy conversion: (a) from DC to AC such as from solar to grid, fuel cell to grid; (b) from AC to DC such as grid to battery; (c) from AC to a variable mechanical load such as AC to all kinds of motors, e.g., on a production line; (d) from DC to a variable mechanical load such as from battery to electric motor in electric vehicles (EVs); (e) from a variable mechanical generator to an AC load such as from a wind turbine to a grid; (f) from a variable mechanical generator to a DC load such as from a wind turbine to a battery; etc. In some embodiments, a mechanical load can be a heat load, e.g., in induction heating.

Another illustrative example involves the application of the inventive principles relating to constant power control to a wind turbine that feeds a grid or other AC load. If the wind flow is constant, i.e., a type of laminar flow versus turbulent flow, then the power harvested is uniform. This may be analogized to constant irradiation on a PV panel. Thus, the uniform power flow has to be stored on cycle-by-cycle basis for transfer to the AC grid. This may be analogized to the cycle-by-cycle power storage to transfer DC power from a PV panel to an AC load.

On the other hand, if the wind flow is turbulent, then the power harvested is dynamic, which may be analogized to a shadowing effect on the PV panel, but possibly much faster and with more variation. In this situation, the inventive principles relating to combining fast MPPT with cycle-to-cycle energy storage may be utilized with beneficial effects. That is, fast MPPT may be used to determine the best operating point at frequent intervals, while a constant power control loop may be utilized to maintain the system at the most recently determined operating point.

Figure 53:
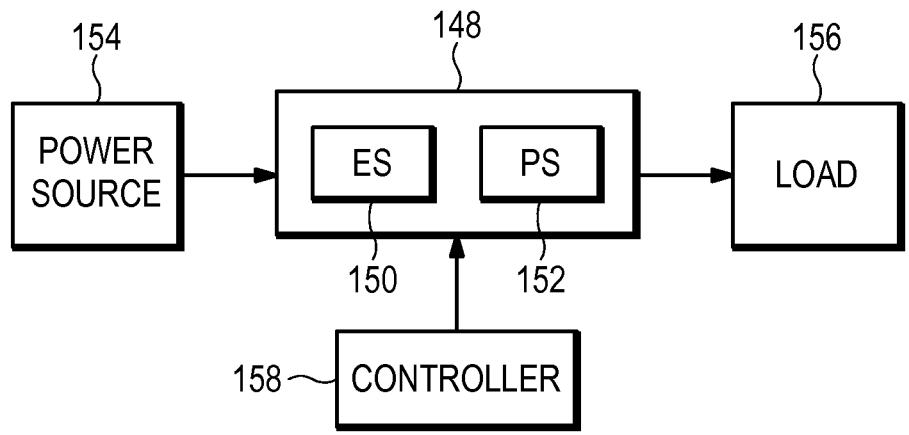
FIG. 53 illustrates another embodiment of a power conversion system according to the inventive principles of this patent disclosure.

FIG. 53 illustrates another embodiment of a power conversion system according to the inventive principles of this patent disclosure. A power path 148 transfers power from a power source 154 to a load 156. The power path includes an energy storage device 150 and a power stage 152. A controller 158 causes the power stage to control power to or from the energy storage device. The power may be controlled to a constant value, a fluctuating value, etc. The power from the power source may have a constant value, fluctuating value, etc. The load power may have a constant value, fluctuating value, etc.

Some additional inventive principles of this patent disclosure relate to mitigation of electromagnetic interference (EMI).

Figure 52:
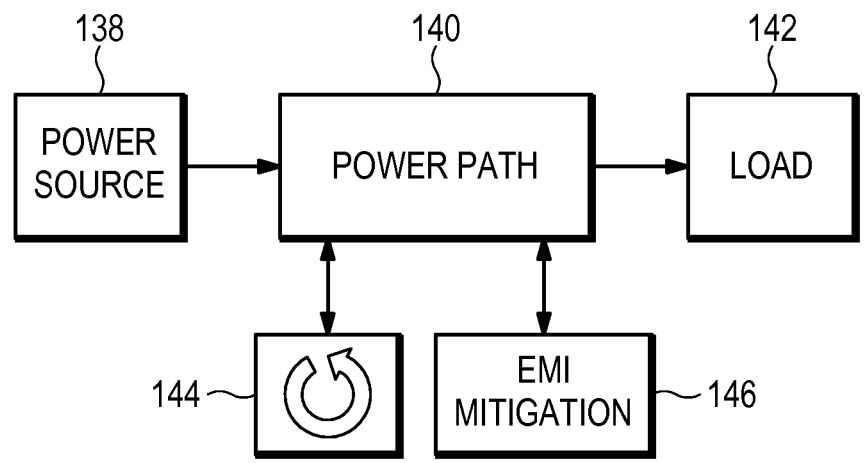
FIG. 52 illustrates an embodiment of a power conversion system having EMI mitigation according to the inventive principles of this patent disclosure.

FIG. 52 illustrates an embodiment of a power conversion system having EMI mitigation according to the inventive principles of this patent disclosure. A power path 140 having one or more power stages transfers power from a power source 138 to a load 142. A constant power control 144 causes the power path to present a constant input impedance to the power source. An EMI mitigation element 146 operates on the power path to reduce or eliminate EMI that originates in the power path.

The inventive principles of this patent disclosure have been described above with reference to some specific example embodiments, but these embodiments can be modified in arrangement and detail without departing from the inventive concepts. For example, some embodiments have been described in the context of delivering power to an AC grid, but the inventive principles apply to other types of loads as well. As another example, some embodiments have been described with capacitors as energy storage devices, and fluctuating DC link voltages, but the inventive principles apply to other types of energy storage devices, e.g., inductors which my provide a DC link current having an AC ripple current instead of voltage. As another example, any of the constant power control techniques described herein may also be implemented with fluctuating power control, or any other type of power control. Such changes and modifications are considered to fall within the scope of the following claims.

The invention claimed is:

1. A system comprising:
 a converter to transfer power between a power source and a load having a fluctuating power demand, the converter comprising a direct current-to-alternating current (DC-AC) output bridge configured to deliver output power to a utility grid;
 a controller to control the DC-AC output bridge of the converter to generate an AC power output, the controller comprising:
 (i) a synchronization function having an input to receive a voltage sensor signal indicative of a grid voltage of the utility grid, the synchronization function configured to generate a phase signal indicative of a phase angle of the voltage sensor signal;

(ii) a distortion mitigation function to receive the phase signal from the synchronization function and a current sensor signal indicative of a grid current of the utility grid, the distortion mitigation function configured to generate a magnitude signal as a function of the phase signal and the current sensor signal, and (ii) a modulator to receive the phase signal from the synchronization function and the magnitude signal from the distortion mitigation function, the modulator configured to generate a modulation signal to control the DC-AC output bridge as a function of the phase signal and the magnitude signal.

2. The system of claim 1, wherein:
the converter further comprises an energy storage device; and
the distortion mitigation function is configured to control a parameter of the energy storage device.

3. The system of claim 2, wherein the distortion mitigation function is configured to slide a DC portion of the parameter to prevent extremes of an AC portion of the parameter from causing unacceptable distortion.

4. The system of claim 1, wherein the distortion mitigation function comprises a sine generator.

5. The system of claim 1, wherein the distortion mitigation function comprises a predistortion circuit.

6. The system of claim 1, wherein the controller comprises grid current control.

7. The system of claim 1, wherein the synchronization function comprises a phase locked loop circuit configured to generate the phase signal indicative of the phase of the phase angle of the voltage sensor signal.

8. The system of claim 1, wherein the synchronization function comprises a delay locked loop circuit configured to generate the phase signal indicative of the phase of the phase angle of the voltage sensor signal.

9. The system of claim 1, wherein the distortion mitigation function
is configured to generate the magnitude signal as a function of the phase signal, the current sensor signal, and a reference current signal.

10. The system of claim 9, wherein the distortion mitigation function further comprises:
a sine generator to receive the phase signal, wherein the sine generator is configured to generate a sinusoidal signal as a function of the phase signal,
a multiplier block configured to generate a scaled sinusoidal signal as a function of the sinusoidal signal generated by the sine generator and the reference current signal,
a comparator to generate an error signal as a function of the scaled sinusoidal signal and the current sensor signal, and
a transfer function block configured to generate the correction signal as a function of the error signal.

11. The system of claim 10, wherein the magnitude signal is a magnitude signal of the error signal.

12. The system of claim 1, wherein the modulator is configured to generate a plurality of switch control signals to control the functionality of a plurality of switches of the DC-AC output bridge.

13. A controller for controlling the operation of a power stage of a converter, the converter configured to supply an alternating current (AC) power output to a utility grid, the controller comprising:
a synchronization function to receive a voltage sensor signal indicative of a grid voltage of the utility grid, the synchronization function configured to generate a phase signal indicative of a phase angle of the voltage sensor signal;
a distortion mitigation function to receive the phase signal from the synchronization circuit and a current sensor signal indicative of a grid current of the utility grid, the distortion mitigation function configured to generate a magnitude signal as a function of the phase signal and the current sensor signal; and
a modulator to receive the phase signal from the synchronization function and the magnitude signal from the distortion mitigation function, the modulator configured to generate a modulation signal to control the power stage of the converter as a function of the phase signal and the modulation signal.

14. The controller of claim 13, wherein the synchronization function comprises a phase locked loop circuit configured to generate the phase signal indicative of the phase of the phase angle of the voltage sensor signal.

15. The controller of claim 13, wherein the synchronization function comprises a delay locked loop circuit configured to generate the phase signal indicative of the phase of the phase angle of the voltage sensor signal.

16. The controller of claim 13, wherein the distortion mitigation function
is configured to generate the magnitude signal as a function of the phase signal, the current sensor signal, and a reference current signal.

17. The system of claim 16, wherein the distortion mitigation function further comprises:
a sine generator to receive the phase signal, wherein the sine generator is configured to generate a sinusoidal signal as a function of the phase signal,
a multiplier block configured to generate a scaled sinusoidal signal as a function of the sinusoidal signal generated by the sine generator and the reference current signal,
a comparator to generate an error signal as a function of the scaled sinusoidal signal and the current sensor signal, and
a transfer function block configured to generate the correction signal as a function of the error signal.

18. The system of claim 17, wherein the magnitude signal is a magnitude signal of the error signal.

19. The controller of claim 13, wherein the modulator is configured to generate a plurality of switch control signals to control the functionality of a plurality of switches of the power stage.

* * * * *